United States Patent
Nakayama et al.

(10) Patent No.: US 8,464,579 B2
(45) Date of Patent: Jun. 18, 2013

(54) RIM MOUNTING DEVICE FOR TIRE TESTING DEVICE, MAGNET MOUNTING METHOD, RIM REPLACING DEVICE AND TIRE TESTING DEVICE

(75) Inventors: Maiko Nakayama, Takasago (JP); Takashi Sumitani, Takasago (JP); Mikio Kato, Takasago (JP); Masao Murakami, Takasago (JP); Hikaru Hamada, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 136 days.

(21) Appl. No.: 13/129,603

(22) PCT Filed: Nov. 25, 2009

(86) PCT No.: PCT/JP2009/069847
§ 371 (c)(1),
(2), (4) Date: May 17, 2011

(87) PCT Pub. No.: WO2010/061845
PCT Pub. Date: Jun. 3, 2010

(65) Prior Publication Data
US 2011/0226050 A1  Sep. 22, 2011

(30) Foreign Application Priority Data

Nov. 28, 2008 (JP) .................. 2008-305079
Dec. 24, 2008 (JP) .................. 2008-327521
Dec. 24, 2008 (JP) .................. 2008-327522

(51) Int. Cl.
*G01M 17/02* (2006.01)
(52) U.S. Cl.
USPC .......................................................... 73/146
(58) Field of Classification Search
None
See application file for complete search history.

(56) References Cited

U.S. PATENT DOCUMENTS 5,992,227 A * 11/1999 Jellison et al. .................. 73/146
6,016,695 A *  1/2000 Reynolds et al. ............... 73/146

FOREIGN PATENT DOCUMENTS

| JP | 1-283131 | 11/1989 |
| JP | 1 283131 | 11/1989 |
| JP | 4 310838 | 11/1992 |
| JP | 8 118509 | 5/1996 |
| JP | 2557306 | 12/1997 |
| JP | 2007 273850 | 10/2007 |

OTHER PUBLICATIONS

International Search Report issue Feb. 9, 2010 in PCT/JP09/69847 filed Nov. 25, 2009.
Combined Chinese Office Action and Search Report issued Dec. 3, 2012, in Patent Application No. 200980147556.0 (with English-language translation).

* cited by examiner

*Primary Examiner* — Andre Allen
(74) *Attorney, Agent, or Firm* — Oblon, Spivak, McClelland, Maier & Neustadt, L.L.P.

(57) ABSTRACT

A rim mounting device configured in such a manner that, even if a permanent magnet breaks due to impact produced during mounting thereof by magnetic attraction, the rim mounting device can be handled easily after the breakage of the permanent magnet. The rim mounting device is provided to a tire testing device having a spindle for rotating a tire and is adapted that a rim is mounted to the tip of the spindle. The rim mounting device is provided with: a rim mounting section provided to the tip of the spindle, having a rim mounting surface capable of making contact with the rim, and having mounting recesses formed in the rim mounting surface so as to be arranged side by side; permanent magnets inserted in the mounting recesses, respectively, and generating magnetic force for attracting the rim to the rim mounting surface; and scatter suppressing members. The scatter suppressing members are provided in the mounting recesses, respectively, and when the permanent magnet inserted in each mounting recess breaks, suppress scatter of fragments of the permanent magnet.

24 Claims, 15 Drawing Sheets

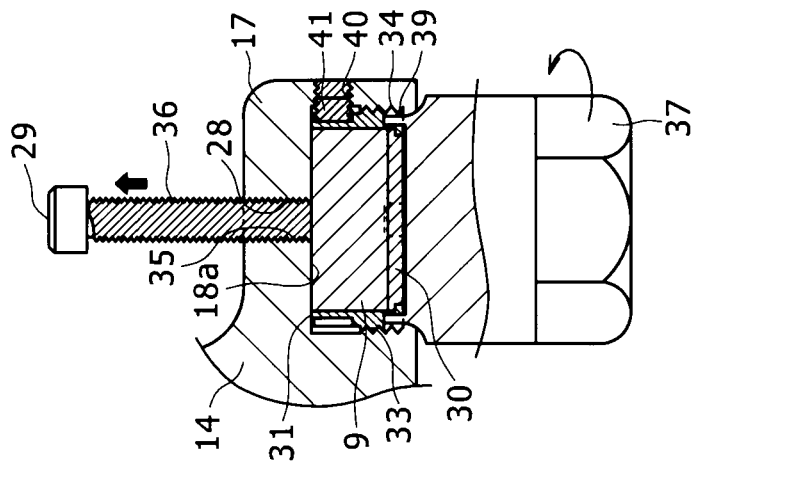
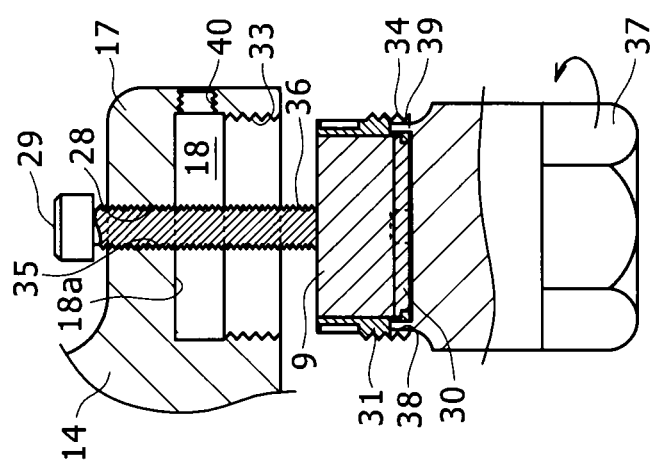
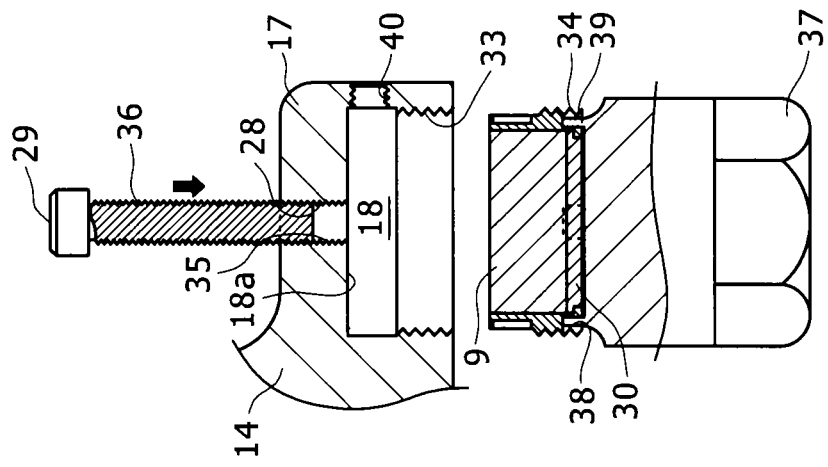

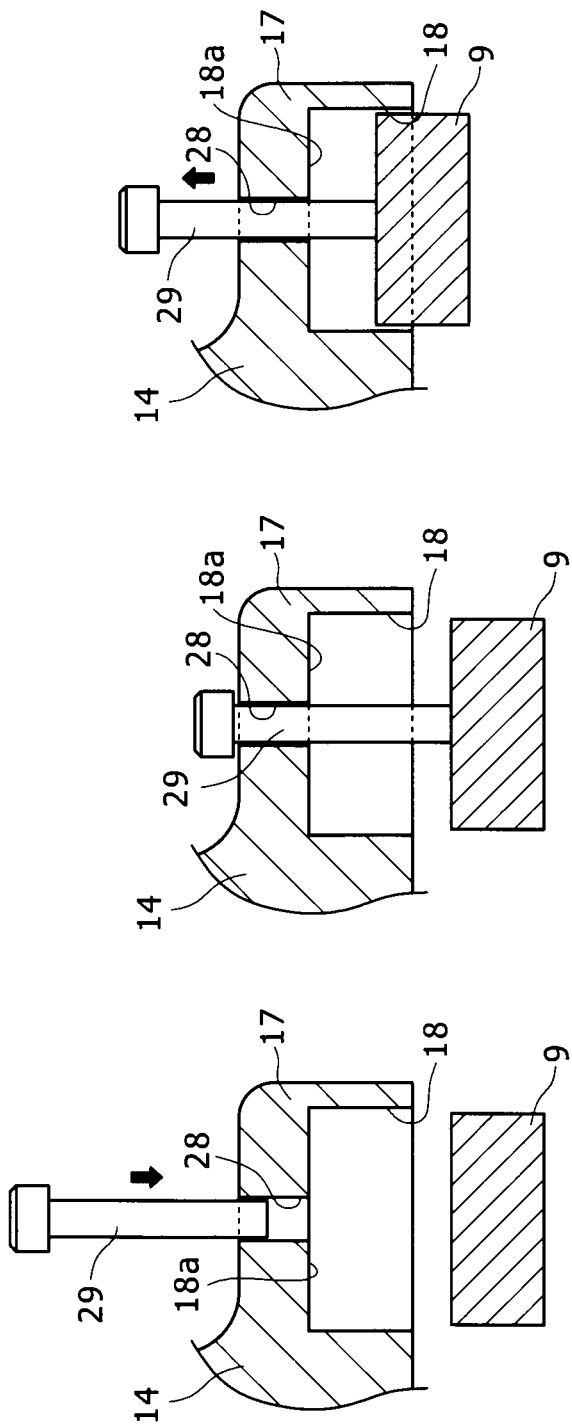

US 8,464,579 B2

RIM MOUNTING DEVICE FOR TIRE TESTING DEVICE, MAGNET MOUNTING METHOD, RIM REPLACING DEVICE AND TIRE TESTING DEVICE

TECHNICAL FIELD

The present invention relates to a magnet mounting method, a rim replacing device to be implemented in a tire testing device, etc. and a tire testing device.

BACKGROUND ART

Conventionally, various types of product testings are carried out with respect to tires in a finished state to measure uniformity (homogeneity), dynamic balance and outer shape thereof, and a tire testing device for carrying out such product testing is provided with a pair of rims which clamp a tire to be tested and support it. There are various types of rims in accordance with the size of the tire which is supported by the rims, so that in case the size or type of the tire to be tested changes, the rims need to be changed as well. Thus, a rim replacing device for replacing such rims is installed in the conventional tire testing device.

As such rim replacing devices, a device, which has a spindle, for instance, and a claw section for fixing a rim to this spindle, is known. This claw section has a base end side section and a hook-like tip end side section which is swingably provided with respect to the base end side section. The rim replacing device further has driving means, such as an actuator, for driving the claw section to swing and fixing the rims to the spindle side.

However, in such a rim replacing device for fixing a rim using a claw section in this way, its construction is likely to become complex, leading to an increase in device costs and making its maintenance difficult.

Accordingly, Patent Document 1 as described hereinafter discloses a rim replacing device having permanent magnets provided therein. In this device, rims are fixed to a spindle due to a magnetic force generated by the permanent magnets and the rims are replaced by detaching them from the spindle against the magnetic force generated by the permanent magnets.

However, a variety of problems caused by the permanent magnets may occur in this device.

For instance, a strong magnetic force is required for the permanent magnets in order to fix the rims to the spindle, but most permanent magnets capable of generating such a strong magnetic force are made of brittle materials such as ferrite, and when a slightly stronger impact is applied to such a brittle material, it is likely to break. Breakage of the permanent magnets will lead to fragment scatter, making handling thereof following such breakage cumbersome.

In this device, as the permanent magnets are brought closer to a mounting section, a force (magnetic attraction force) with which these elements attract each other due to the magnetic force generated by the permanent magnets becomes stronger, and the permanent magnets may strongly hit the mounting section due to such force, which is likely to cause it to break. Alternatively, breakage of a permanent magnet can also occur, when the permanent magnet is installed in a mounting hole, and if the permanent magnet is accidentally strongly attracted to an inner circumferential surface of a mounting recess or a spindle surface at a periphery of an opening of the mounting recess. When magnet fragments produced when the permanent magnet breaks as described above are scattered, they easily magnetically attach, for instance, to the inner circumferential surface of the mounting recess or the surface of the spindle, and a fragment removal operation becomes necessary, causing a decrease in productivity.

In the rim replacing device according to Patent Document 1, to mount an upper rim to an upper spindle, permanent magnets for attracting the upper rim to the upper spindle due to magnetic force are mounted in the upper spindle, and to remove the upper rim from the upper spindle, a transmission rod is provided in the upper spindle to depress the upper rim downward and detach it from the upper spindle, which may cause the following problems to occur in the tire testing device.

In the rim replacing device, as a detaching device for detaching the upper rim from the upper spindle needs to be provided at a position where permanent magnets are not present, installation of the detaching device reduces a space capable of housing the permanent magnets, so that the number of permanent magnets which can be provided is reduced. On the one hand, in response to the recent increase in diameter of rims, there is much request for devices which can handle a larger number of permanent magnets and enable fixing of heavyweight rims. The device disclosed in the Patent Document 1 cannot sufficiently satisfy these demands.

In the rim replacing device according to Patent Document 1, the transmission rod is provided so as to move inside a guide sleeve provided in a flange, for instance, of the upper spindle, so that at the time of tire testing, the transmission rod and the guide sleeve are rotated together with the upper spindle, and a resulting error component is applied to uniformity measurement data, which can cause a decrease in the uniformity measuring accuracy.

[Related Art Document]
[Patent Document]
[Patent Document 1] Japanese Patent No. 2626902 (refer to FIG. 1, FIG. 2 and FIG. 3)

SUMMARY OF THE INVENTION

It is an object of the present invention to solve any problems caused by permanent magnets used for rim mounting in a tire testing device as described above.

More specifically, it is an object of a first aspect of the present invention to provide a rim mounting device which can be handled easily even after permanent magnets break due to an impact produced during mounting thereof by magnetic attraction. The rim mounting device according to this invention is a rim mounting device that is installed in a tire testing device having a spindle for rotating a tire, and is adapted to mount a rim to a tip of the spindle, the rim mounting device, including: a rim mounting section provided at the tip of the spindle, the rim mounting section having a rim mounting surface capable of being contacted with the rim, and a plurality of mounting recesses formed on the rim mounting surface so as to be arranged side by side; a plurality of permanent magnets mounted in the rim mounting section so as to be inserted in the mounting recesses, respectively, and adapted to generate a magnetic force for attracting the rim to the rim mounting surface; and a scatter suppression member provided inside each of the mounting recesses, and being adapted to suppress scatter of fragments generated when each permanent magnet inserted in each mounting recess breaks. This scatter suppression member prevents scatter of fragments at the time the permanent magnets break due to an impact at the time of magnetically mounting the magnets, thereby making handling after such breakage easy.

It is an object of a second aspect of the present invention to provide a magnet mounting method which can prevent breakage of the permanent magnet caused when the permanent magnet is strongly attracted to a predetermined mounting location due to its magnetic force, making the permanent magnet mounting operation more easy and efficient. The magnet mounting method according to this invention is a method for mounting a permanent magnet in a spindle of a tire testing device, including the spindle for rotating a tire, a rim fixed to this spindle for holding the tire at the spindle side, and a permanent magnet generating a magnetic force to fix the rim to the spindle, the method, including: forming, in the spindle, a bottomed mounting recess, in which the permanent magnet is inserted, and a through hole extending from a bottom surface of this mounting recess towards a side of the mounting recess opposite to an opening thereof; inserting a guide member in the through hole, so that an end section thereof penetrates from the bottom surface of the mounting recess towards the opening side thereof; and inserting the permanent magnet inside the mounting recess while the bottom section side of the permanent magnet is supported by the end section of the guide member against a force of the bottom surface that attracts the permanent magnet due to a magnetic force of the permanent magnet.

Alternatively, this magnet mounting method may include: forming, in the spindle, a bottomed mounting recess, in which the permanent magnet is inserted; preparing a case body adapted to prevent direct contact between the permanent magnet and an inner circumferential surface and the bottom surface of the mounting recess; forming an outer circumferential surface of the case body and an inner circumferential surface of the mounting recess in shapes that allow their thread engagement; screwing the case body into the mounting recess to insert the case body together with the permanent magnet in the mounting recess while a bottom section side of the permanent magnet is supported by the case body against a force of the bottom surface of the mounting recess attracting the permanent magnet due to a magnetic force of the permanent magnet.

It is an object of a third aspect of the present invention to provide a rim replacing device of a tire testing device which makes it possible to reliably fix even a heavyweight upper rim to an upper spindle and easily detach it therefrom and does not cause a decrease in uniformity measuring accuracy. To achieve such an objective, the rim replacing device according to this invention is a rim replacing device provided in a tire testing device, the tire testing device including an upper rim and a lower rim capable of clamping a tire, an upper spindle for holding the upper rim, a lower spindle for holding the lower rim so that an axial center thereof becomes coaxial with an axial center of the upper rim, an upper spindle housing for rotatably supporting the upper spindle around the axial center, and an upper frame for supporting the upper spindle housing, the rim replacing device being adapted to replace the upper rim held by the upper spindle and including: a plurality of permanent magnets respectively provided in the upper spindle at a plurality of locations around an axial center thereof and generating a magnetic force for attracting the upper rim to the upper spindle; and a detaching device for detaching the upper rim, which is attracted to the upper spindle by the magnetic force of these permanent magnets, from the upper spindle. The detaching device is fixed to the upper frame and presses the upper rim at a position radially outward remote from an outer circumferential surface of the upper spindle, in a direction to detach this upper rim from the upper spindle.

BRIEF DESCRIPTION OF THE DRAWINGS

FIG. 7 (a)~(c) are explanatory diagrams showing a magnetic mounting method and a magnet removal method to be implemented in the rim mounting device according to the sixth embodiment.

FIG. 8 (a)~(c) are explanatory diagrams showing a magnet mounting method and a magnet removal method according to a seventh embodiment of the present invention.

EMBODIMENTS FOR CARRYING OUT THE INVENTION

Hereinafter, embodiments of the present invention will be described with reference to the drawings.

Figure 1:
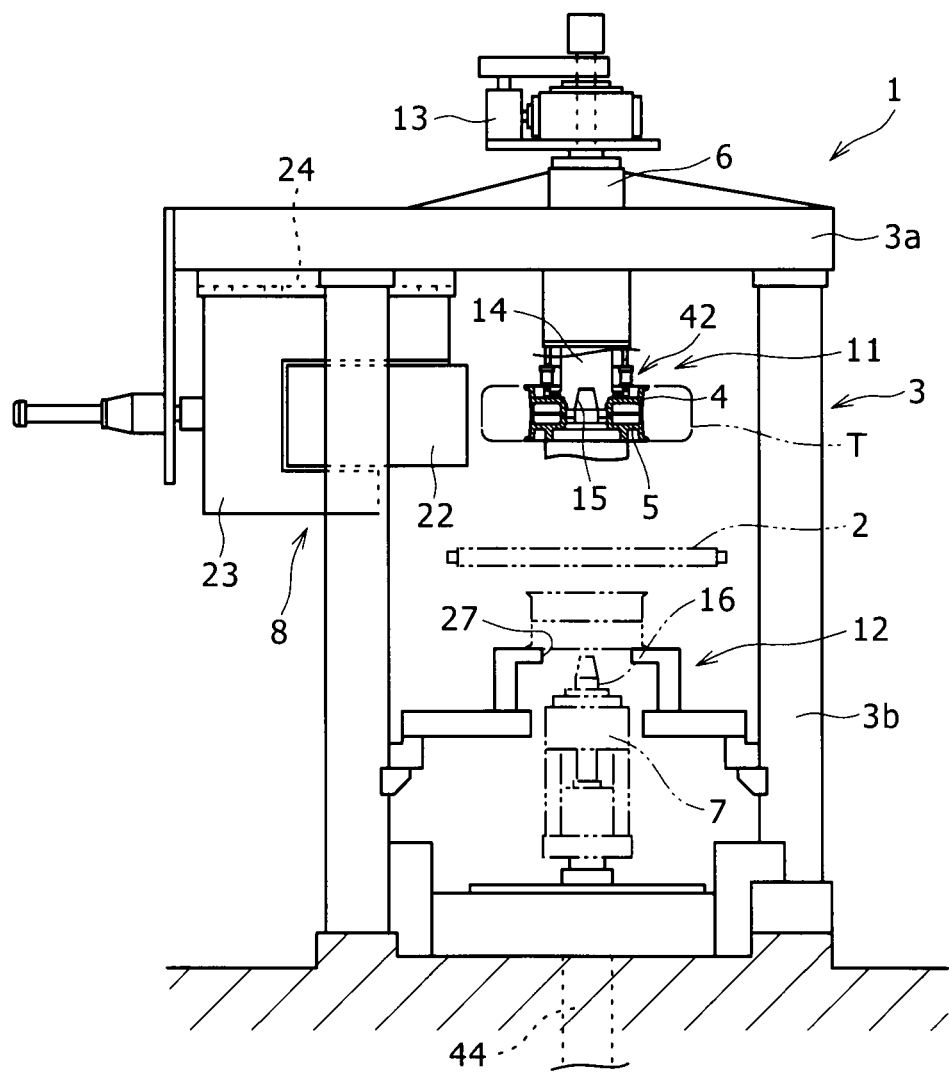
FIG. 1 is a front view of a tire testing device having a rim mounting device according to the present invention.

FIG. 1 is a front view of a tire testing device 1 having a rim mounting device 42 provided therein according to an embodiment of the present invention. In the description to follow, a vertical direction in FIG. 1 indicates the vertical direction (perpendicular direction) for describing the tire testing device 1.

As shown in FIG. 1, the tire testing device 1 is a device for carrying out product testing such as measuring the uniformity and shape of a tire T, or otherwise, the dynamic balance thereof and is provided with a transport roller 2, a frame 3, an upper spindle 14 and a lower spindle 16, an upper spindle housing 6 and a lower spindle housing 7, and a drum section 8.

The transport roller 2 transports the tire T to be tested in a horizontal direction. The upper spindle 14 and the lower spindle 16 hold an upper rim 4 and a lower rim 5, respectively; and rims 4 and 5 clamp the tire T which is transported by the transport roller 2 from a vertical direction, thus allowing for the tire T to be tested. The transport roller 2 transports the tire T in a direction from a back side toward a front side in FIG. 1.

The frame 3 has an upper frame 3a which stretches over the transport roller 2, and a plurality of support members 3b which support the upper frame 3a from below, and also, the spindles 14 and 16 and the drum section 8 are provided inside the frame 3. The drum section 8 approaches the tire T which is held by the upper rim 4 and the lower rim 5 from a horizontal direction to come in contact therewith, making it possible to measure the uniformity and shape of the tire.

Figure 2:
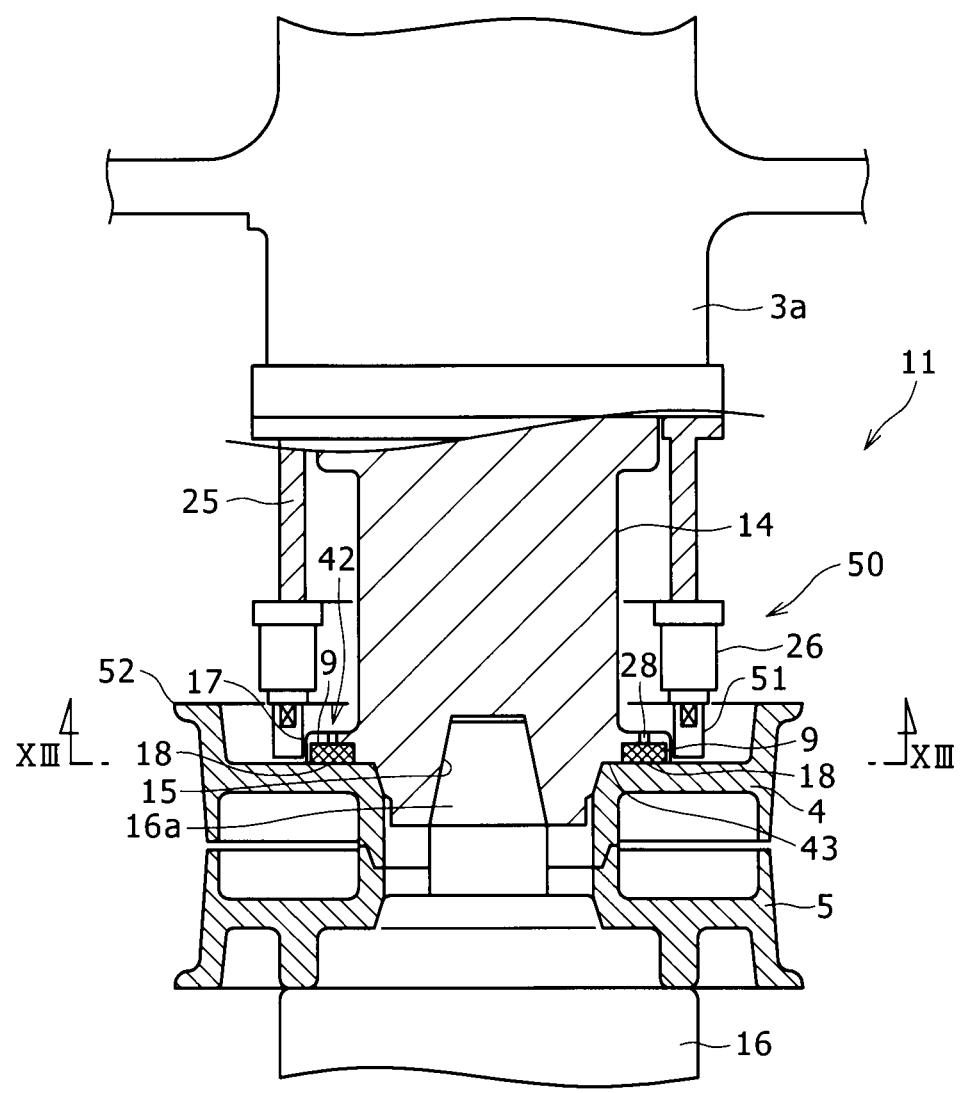
FIG. 2 is an enlarged view of an upper spindle of the tire testing device.

The upper spindle housing 6 is adapted to rotatably hold the upper spindle 14 around a vertical shaft. A drive motor 13 is provided at an upper side of the frame 3 and drives the upper spindle 14 to rotate in a forward and reverse direction. As shown in FIG. 2, an engaging section 15 is formed at a lower end surface of the upper spindle 14 and is recessed in an upward direction, and also, a shaft 16a is provided at a tip of the lower spindle 16 to fit in the engaging section 15. As a result of the engaging section 15 and the shaft 16a being engaged, the upper spindle 14 and the lower spindle 16 become coupled together in one straight line.

A lower tip of the upper spindle 14 has a flange 17 which overhangs outward in a radial direction with respect to the rest of the circumferential surface. The lower surface of the flange 17 constitutes an upper rim mounting surface 43 which has a flat portion capable of coming in contact with the upper rim 4. A plurality of mounting recesses 18 which are recessed in an upward direction are formed in a lower surface of the flange 17 side by side around the rotary shaft of the upper spindle 14. A permanent magnet 9 is mounted inside each mounting recess 18. These permanent magnets 9 generate a magnetic force for attracting the upper rim 4 to the upper rim mounting surface 43.

As shown in FIG. 1, the lower spindle 16 is held in the lower spindle housing 7 via bearings which are omitted from the drawing so as to allow rotation thereof around a vertical shaft. The lower spindle housing 7 is mounted to an extending/contracting section (lift cylinder) 44 embedded at a ground side of the lower spindle housing 7. The extending/contracting section 44 extends/contracts in a vertical direction to lift or lower the lower spindle housing 7.

Figure 3:
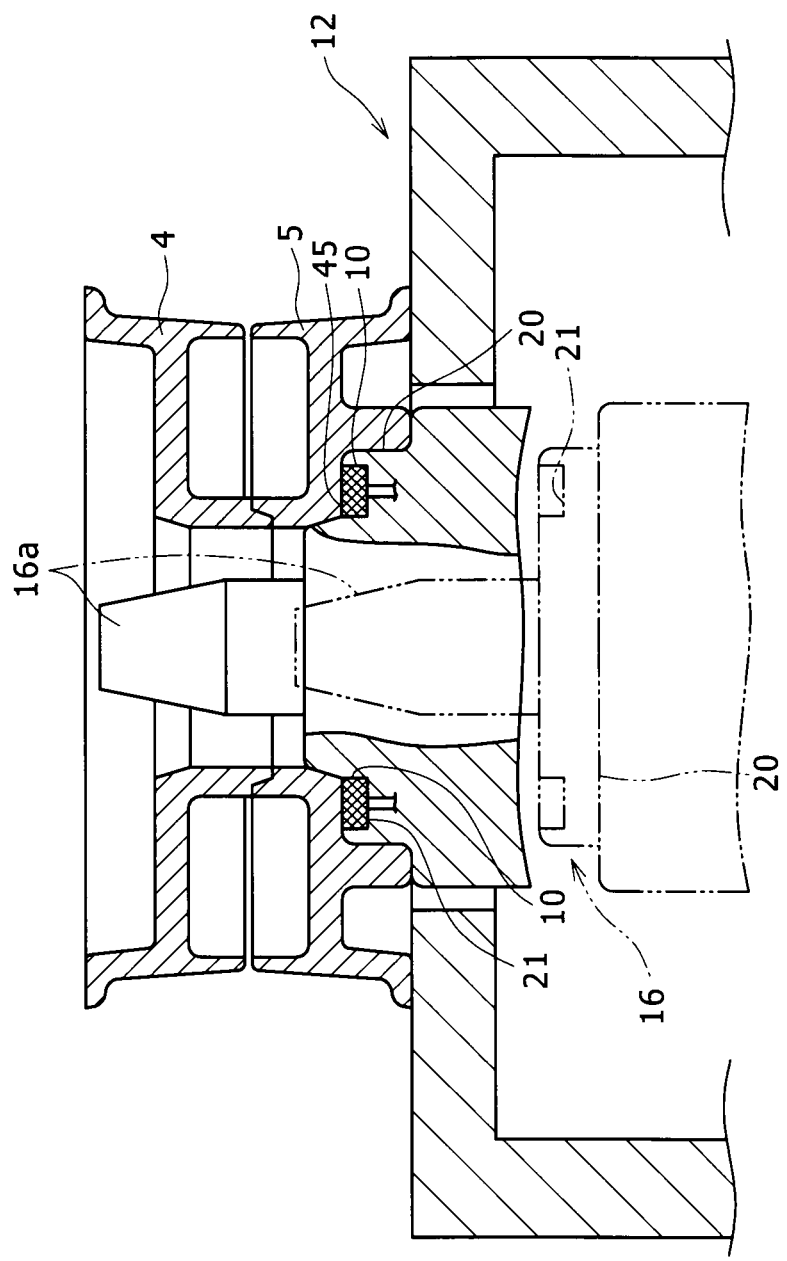
FIG. 3 is an enlarged view of a lower spindle of the tire testing device.

As shown in FIG. 3, a shaft 16a provided at the tip of the lower spindle 16 has a tapered shape in an upward direction. A portion around the shaft 16a constitutes a flange 20 which is one level higher than an outer side portion thereof, and an upper surface of the flange 20 constitutes a mounting surface 45 of the lower rim 5 which includes a flat part that can come in close contact with the lower rim 5. A plurality of mounting recesses 21 which are recessed in a downward direction are formed in an upper surface of the flange 20 side by side around a rotary shaft of the lower spindle 16, and a permanent magnet 10 is mounted in each mounting recess 21. These permanent magnets 10 generate a magnetic force for attracting the lower rim 5 to the lower rim mounting surface 45.

The tire testing device 1 also has a rim attaching/detaching mechanism including the upper and lower permanent magnets 9 and 10 which magnetically attract the upper and lower rims 4 and 5 to the upper and lower spindles 14 and 16, and upper and lower rim replacing devices 11 and 12 which are adapted to mount/detach the upper and lower rims 4 and 5 with respect to the upper and lower spindles 14 and 16, respectively, in accordance with the type and size of the tire T.

As shown in FIG. 2 and FIG. 3, in the event of mounting the upper and lower rims 4 and 5, the rim attaching/detaching mechanism magnetically attaches the upper and lower rims 4 and 5 to the upper and lower spindles 14 and 16 through the upper and lower permanent magnets 9 and 10 which are provided in the flanges 17 and 20 of the upper and lower spindles 14 and 16 as described above. Then, in the event of detaching the upper and lower rims 4 and 5, the upper rim 4 is detached from the upper spindle 14 using the upper rim replacing device 11, and after the upper rim has been removed using the upper rim replacing device 11, the lower rim 5 is detached from the lower spindle 16 using the lower rim replacing device 12.

As shown in FIG. 2, the upper rim replacing device 11 has a bracket 25 which is mounted in such a manner as to hang down from the upper frame 3a of the frame 3, and an actuator 26 which is provided at a lower end of the bracket 25 and is adapted to output a pressing force which acts to detach the upper rim 4 from the flange 17 of the upper spindle 14.

The lower rim replacing device 12 is a box-shaped member which is mounted to the frame 3, and has a lower rim attaching/detaching hole 27 formed in an upper surface thereof. The lower rim attaching/detaching hole 27 has a diameter which allows passage of the lower spindle 16 in a vertical direction with respect to the flange 20, but does not allow passage in a vertical direction with respect to the lower rim 5, and also is shaped so as to allow the lower rim 5 to be detached from the lower spindle 16 at the time the lower spindle 16 with the lower rim 5 magnetically attached thereto moves downward.

At the time of mounting the upper and lower rims 4 and 5 to the upper and lower spindles 14 and 16 using the rim attaching/detaching mechanism, the upper and lower rims 4 and 5 may be preliminarily mounted on the lower rim replacing device 12, which are in a layered state, while making them to be concentric with the lower rim attaching/detaching hole 27, and then the lower spindle 16 may be extended upwards. As a result, the lower permanent magnets 10 first attract the lower rim 5 to the lower spindle 16, and then, the upper permanent magnets 9 attract the upper rim 4 to the upper spindle 14, whereby mounting the upper and lower rims 4 and 5.

For the explanation of the tire testing device 1, a direction radially away from a rotary shaft of the upper spindle 14 is designated as "radially outward", while a direction approaching toward a rotary shaft is designated as "radially inward".

As shown in FIG. 1, the drum section 8 is hung from the upper frame 3a of the frame 3 to be arranged lateral to a position where the upper and lower spindles 14 and 16 are coupled with each other. The drum section 8 includes a rotating drum 22 which has a vertical shaft and a cylindrical shaped outer circumferential surface with the vertical shaft as a center axis, and a drum support body 23 which is adapted to rotatably support the rotating drum 22 around the center axis. The outer circumferential surface of the rotating drum 22 constitutes a virtual road surface which comes in contact with the tire T. The rotating drum 22 is rotated so that a road surface friction force, which is generated by the contact of the virtual road surface and the tire T follows the rotation of the tire T. The drum support body 23 has a vertical body wall, and an upper wall and lower wall which protrude in a horizontal direction from an upper end and lower end of the body wall towards spindles 14 and 16, respectively, and is adapted to support the shaft of the rotating drum 22 with the rotating drum 22 being positioned between the upper wall and the lower wall. A guide rail 24 is provided between the drum support body 23 and the lower surface of the upper frame 3a. The guide rail 24 extends in a direction connecting the drum support body 23 and the coupling position between the spindles 14 and 16 (horizontal direction), and is adapted to hold the drum support body 23 so as to allow it to slide in this direction.

In this tire testing device 1, the permanent magnets 9 and permanent magnets 10 which are provided in the flanges 17 and 20 of the upper spindle 14 and lower spindle 16, respectively, have the role of fixing the upper rim 4 and lower rim 5 to the flanges 17 and 20, as described above, and therefore the permanent magnets 9 need to generate a strong magnetic force for reliably fixing these components. Most of such permanent magnets which exhibit strong magnetic force are made of brittle materials, such as ferrite, and easily break when a strong impact is applied thereto. The scattering of multiple fragments due to such breakage may make handling after such breakage difficult. For instance, in this tire testing device 1, when the type or size of the tire T is changed, the upper rim 4 and the lower rim 5 in addition to the tire T are often replaced, and these scattered fragments may disturb the mounting of these rims 4 and 5. In addition, collection and disposal of these scattered fragments requires a lot of time and labor. This will lower efficiency of the replacement operation.

This tire testing device 1 is accordingly provided with a means for suppressing scatter of fragments due to breakage of the permanent magnets 9 and 10. More specifically, bottomed mounting recesses 18 and 21 are respectively formed in the lower surface of the flange 17 and the upper surface of the flange 20 (in the present embodiment, the upper rim mounting surface 43 and the lower rim mounting surface 45) and in addition to the permanent magnets 9 and permanent magnets 10 which are respectively inserted in the bottomed mounting recesses, scatter suppression members are provided in the mounting recesses 18 and 21, respectively for suppressing scatter of fragments caused by breakage of the permanent magnets 9 and 10.

A plurality of embodiments with respect to this rim mounting device including the scatter suppression members are shown in FIG. 5(a)~(e). The rim mounting device according to the present invention can be built on at least one of the upper spindle 14 side and the lower spindle 16 side, however, hereinafter, a description will be given taking a rim mounting device 42 as built on the upper spindle 14 side as example.

Figure 5A:
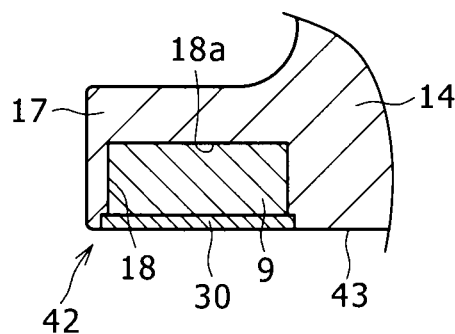
In FIG. 5, a) is a sectional view showing a rim mounting device according to a first embodiment, as provided in the tire testing device; b) is a sectional view showing a rim mounting device according to a second embodiment, as provided in the tire testing device; c) is a sectional view showing a rim mounting device according to a third embodiment, as provided in the tire testing device; d) is a sectional view showing a rim mounting device according to a fourth embodiment, as provided in the tire testing device; and e) is a sectional view showing a rim mounting device according to a fifth embodiment, as provided in the tire testing device.
Figure 5B:
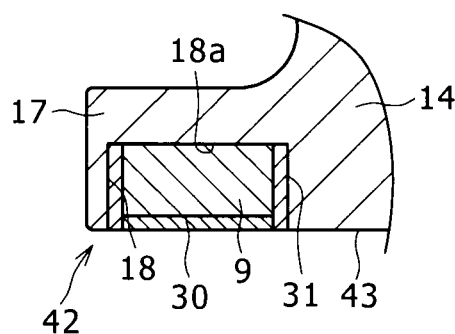

FIG. 5(a) shows the rim mounting device 42 according to a first embodiment. This rim mounting device 42 includes the flange 17 which represents a rim mounting section, a plurality of permanent magnets 9 which is respectively inserted inside the plurality of bottomed mounting recesses 18 formed in this flange 17, and a lid body 30 which corresponds to a scatter suppression member provided inside each mounting recess 18.

Figure 4:
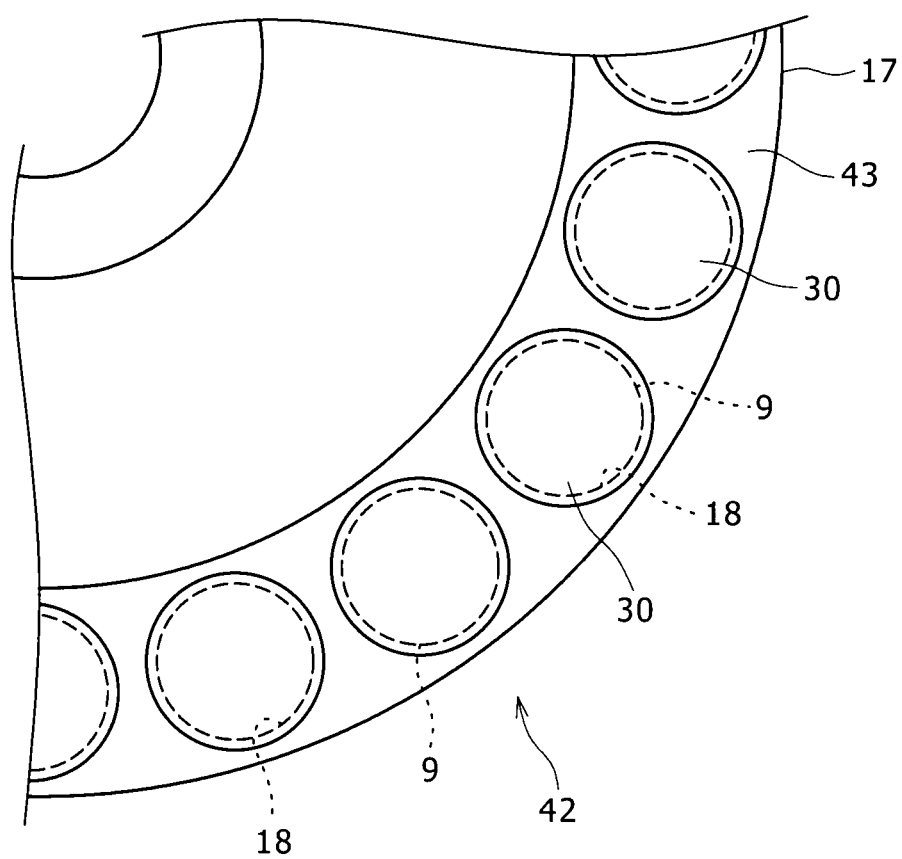
FIG. 4 is a view showing how permanent magnets are arranged in a flange of the upper spindle.

As shown in FIG. 4 which is a plan view of FIG. 5(a), the mounting recesses 18 are provided at a plurality of positions (in the present embodiment, 20 locations) on the upper rim mounting surface 43 in the upper spindle 14 so as to be arranged on a concentric circle centered around the axis of the upper spindle 14 and in a circumferential direction at constant intervals. The intervals between adjacent mounting recesses 18 do not necessarily have to be constant. However, the arrangement of these mounting recesses 18 at constant intervals equalizes the force the upper rim mounting surface 43 attracts the upper rim 4, and ensures a more reliable fixing of the upper rim 4. The permanent magnets 9 are arranged particularly at intervals smaller than a radius thereof so that they are arranged adjacently to each other, making it possible to efficiently use the magnetic force of each permanent magnet 9.

As shown in FIG. 5(a), each mounting recess 18 opens downward, and has a cylindrical shaped inner circumferential surface and a bottom surface 18a which is located above the inner circumferential surface. In more detail, the end section on the opening side of the mounting recesses 18, in other words, the lower end section has an inner diameter, which is slightly larger than the inner diameter of the main body part at a back side of the lower end section. A difference in level is, thus, provided between the two parts. Since the inner diameter of the main body part corresponds to the outer diameter of the permanent magnet 9, it makes it possible to insert the permanent magnet 9 inside the main body part from below.

More specifically, the permanent magnet 9 has a cylindrical shape with an outer diameter slightly smaller than the inner diameter of the main body part of the mounting recess 18, and a thickness which is equal to the depth of the main body part of the mounting recess 18. Accordingly, the permanent magnet 9 is reliably fitted in an upper section of the mounting recess 18 (main body section at the back side).

This permanent magnet 9 is made of a magnetic body such as a ferrite magnet, a neodymium magnet, a samarium cobalt magnet or the like. On the one hand, at least the flange 17 (in the present embodiment, the upper spindle 14 including the flange 17) is formed of a magnetic material, and accordingly, the permanent magnet 9 is attracted to the bottom surface 18a of the mounting recess 18 by the magnetic force the permanent magnet 9 generates. This relationship is the same as between the permanent magnet 10 and the flange 20 of the lower spindle 16 where this magnet is mounted.

The lid body 30 has a disc shape with an outer diameter corresponding to the inner diameter of the end section at the opening side of the mounting recess 18, and is embedded in the end section at the opening side thereof to cover the opening section of the mounting recess 18. This lid body 30 (scatter suppression member) is formed of a non-magnetic material (for instance, a metallic material such as aluminum, copper, stainless steel, or synthetic resin), so as to prevent it from being attracted to the permanent magnet 9 due to the magnetic force generated by the permanent magnet 9. This lid body 30 has an outer diameter larger than the outer diameter of the permanent magnet 9 and is arranged at a lower side of the permanent magnet 9 at a position where the shaft center of the lid body 30 coincides with the shaft center of the cylindrical shaped permanent magnet 9 to cover the entire lower surface of the permanent magnet 9. The lid body 30 has a thickness (dimension in a vertical direction) which is equal to or smaller than the depth of the end section at the opening side of the mounting recess 18 (lower end part) so as to prevent the lower surface of the lid body 30 from projecting downward with respect to the upper rim mounting surface 43, in other words, so that the lower surface of the lid body 30 is arranged on the same plane as the upper rim mounting surface 43, or at a further back side of the mounting recess 18 than the upper rim mounting surface 43 (upper side in FIG. 5(a)).

Therefore, when the permanent magnet 9 and the lid body 30 are inserted inside the mounting recess 18, first, the permanent magnet 9 is inserted in the main body section (upper portion) of the mounting recess 18, and the lid body 30 is then fitted in the end section on the opening side of the mounting recess 18 (lower end section), so that the entire opening of the mounting recess 18 is covered by the lid body 30, with the permanent magnet 9 housed therein. The lid body 30 suppresses the scatter of the fragments of the permanent magnet 9, which fragments are produced as a result of breakage of the permanent magnet 9 due to an impact applied at the time of mounting the upper rim 4, for instance, from being scattered from the mounting recess 18 to the outside, which prevents these fragments from adversely influencing the rim replacing work, making it easier to handle the device after breakage.

The lid body 30 may be made of a magnetic material, in which case the magnetic field lines generated from the permanent magnet 9 stretch towards the outer peripheral side (the side of the spindle made of magnetic material) via the lid body 30, and thus there is a risk the magnetic force for attracting the rim is reduced. Contrary to this, the lid body 30, which is made of a non-magnetic material as described above, will not weaken the magnetic force towards the upper rim 4, allowing the permanent magnet 9 to exert sufficient magnetic force towards the upper rim 4 to ensure more reliably attraction of the upper rim 4 to the upper rim mounting surface 43.

When the lower surface of the lid body 30 (opposite surface with respect to the upper rim 4) is positioned on the same plane as the upper rim mounting surface 43, with the lid body 30 being fitted in an end section at the opening side of the mounting recess 18, this alleviates the impact which is applied to the permanent magnet 9 at the time of mounting the upper rim 4, lowering the risk of breakage of the permanent magnet 9. Particularly if the lid body 30 is made of a synthetic resin, the lid body 30 can act as a shock-absorbing material, which further lowers the risk of breakage of the permanent magnet 9.

Further, when the lower surface of the lid body 30 (opposite surface) is positioned at a further back side of the mounting recess 18 than the upper rim mounting surface 43, with the lid body 30 being fitted in an end section on the opening side of the mounting recess 18, the impact, which is generated at the time of mounting the upper rim, acts only on the upper rim mounting surface 43, and is not directly transmitted to the lid body 30, which further alleviates the impact on the permanent magnet 9, further lowering the risk of breakage of the permanent magnet 9.

FIG. 5(*b*) shows a rim mounting device 42 according to a second embodiment. This mounting device 42 is further provided with a case body 31 which has a cylindrical shape with an opening at a lower end and upper end thereof and is made of a non-magnetic material, and a permanent magnet 9 is arranged inside the case body 31. More specifically, the case body 31 encloses the permanent magnet 9 from a direction orthogonal to the direction of the opening in the mounting recess 18. This case body 31 is inserted in the mounting recess 18 so that a lower end thereof faces the upper rim mounting surface 43. On the one hand, unlike the first embodiment, the lid body 30 according to the second embodiment is formed of a magnetic material and is mounted so as to cover the permanent magnet 9, with an outer circumferential surface of the lid body 30 being in contact with the inner circumferential surface of the lower end section (end section on the opening side) of the case body 31.

Specifically, the case body 31 has a cylindrical shape and is made of the same non-magnetic material as the lid body 30 according to the first embodiment. The permanent magnet 9 is inserted in the upper inside of the case body 31, while the lid body 30 is inserted in the lower inside thereof. The case body 31 has an inner diameter which allows for the permanent magnet 9 to be inserted in the inside thereof. The lid body 30 covers a lower surface of the permanent magnet 9, with the outer circumferential surface of the lid body 30 coming in contact with the inner circumferential surface of the case body 31. Unlike the first embodiment, the mounting recess 18 according to the second embodiment is formed to have a straight bottomed cylindrical shape with a constant inner diameter, and permits the permanent magnet 9 and lid body 30 to be inserted in the mounting recess 18 by inserting the case body 31 in the mounting recess 18.

The case body 31, made of non-magnetic material in this way, is not attracted by the inner circumferential surface of the mounting recess 18 at the time of attachment/detachment thereof with respect to the mounting recess 18, and also lowers the magnetic force acting from the permanent magnet 9 towards the inner circumferential surface of the mounting recess 18 in the upper spindle 14 made of magnetic material. As a result, the permanent magnet 9 can be smoothly inserted in the mounting recess 18 without being disturbed by such magnetic force.

Furthermore, if the lid body 30 is mounted with the outer circumferential surface of the lid body 30 coming in contact with the inner circumferential surface of the case body 31 made of a non-magnetic material, a part of the magnetic force of the permanent magnet 9 is prevented from acting toward the upper spindle 14 via the lid body 30 even if the lid body 30 is formed of a magnetic material, which suppresses a decrease in the magnetic force of the permanent magnet 9 for attracting the upper rim 4.

The construction according to the second embodiment, other than the construction as described above, is the same as that in the first embodiment, and therefore, a description thereof is hereby omitted.

FIG. 5(*c*) shows a rim mounting device 42 according to a third embodiment. The differences between this rim mounting device 42 and the device according to the second embodiment will be described hereinafter.

a) In the second embodiment, a case body 31 made of a non-magnetic material and having openings at an upper end and lower end thereof is employed, whereas in the third embodiment, a bottomed case body 31 having an opening at the lower end only is employed.

b) In the third embodiment, a through hole 28 is formed in the flange 17 to extend from an upper surface thereof (outside of the upper spindle 14) to the bottom surface 18*a* of the mounting recess 18 and it communicates with the inside of the mounting recess 18. The through hole 28 is in a linear shape vertically connecting the bottom surface 18*a* of the mounting recess 18 and the upper surface of the flange 17, and has a smaller pore diameter than the inner diameter of the mounting recess 18 and the outer diameter of the permanent magnet 9. A bar-shaped guide member 29, for instance, is inserted inside the through hole 28 from above, and the lower end of the guide member 29 is made to be contacted with the upper end of the case body 31, and thereby the through hole 28 makes it possible to slowly mount the permanent magnet 9 inside the mounting recess 18 while supporting the permanent magnet 9 against a force with which the bottom surface 18*a* of the mounting recess 18 attracts the permanent magnet 9 due to the magnetic force of the permanent magnet 9. More specifically, this prevents the permanent magnet 9 from strongly hitting the bottom surface 18*a* of the mounting recess 18 due to the magnetic force of the permanent magnet 9 itself, and breaking as a result thereof.

In case of detaching the permanent magnet 9 from the mounting recess 18, the bar-shaped guide member 29 may be inserted in the through hole 28 so that it pushes down the case body 31 from above. Assuming that the permanent magnet 9 breaks as a result of this operation, and fragments thereof are present inside the mounting recess 18, these fragments are all pushed out of the mounting recess 18 at once by the case body 31. This enables a more efficient clean-up of the fragments, making handling after such breakage easier. Accordingly, the present embodiment is particularly effective in the case a magnet which breaks easily is used as the permanent magnet 9 and the case a magnet which easily breaks into small fragments is used as the permanent magnet 9.

Figure 5C:
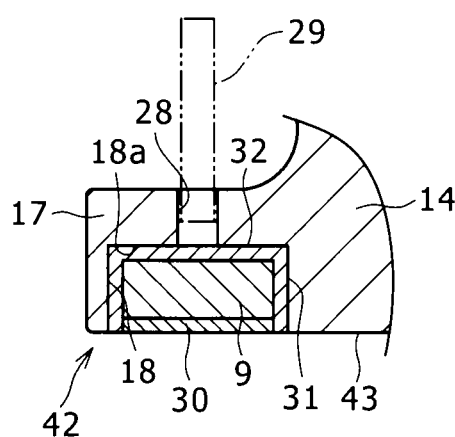

FIG. 5(c) shows a case body 31 which is entirely constructed of one single member, however, the same advantages can be obtained even if this case body is divided into a bottom body which covers the bottom surface of the mounting recess 18 and a cylindrical body which opens upward and downward. In this case, the bottom body can be made of a magnetic material, and as a result, the same advantages as those in a fourth embodiment to be described later can be obtained.

The construction of the rim mounting device 42 according to the third embodiment, other than as described above, is the same as in the second embodiment, and therefore, further description thereof is hereby omitted.

Figure 5D:
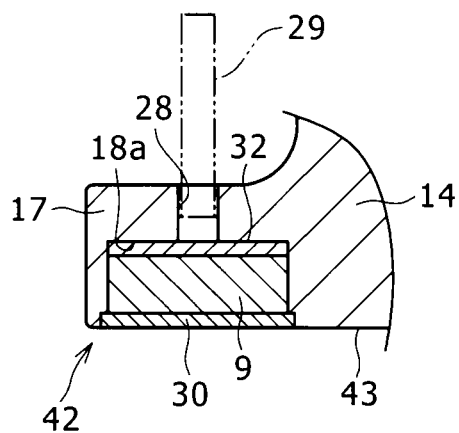

FIG. 5(d) shows a rim mounting device 42 according to a fourth embodiment. This rim mounting device 42 differs from the device according to the first embodiment in that a bottom body 32 which covers the entire bottom surface is mounted on the bottom surface of the mounting recess 18. A through hole 28 which is similar to the one in the third embodiment is also provided on a bottom surface side of the mounting recess 18.

A bottom body 32 is formed to have a cylindrical shape with an outer diameter corresponding to an inner diameter of the mounting recess 18. In more detail, the outer diameter of the bottom body 32 is set to be slightly smaller than the inner diameter of the mounting recess 18 which covers the entire bottom surface of the mounting recess 18, which enables the bottom body 32 to move up and down inside the mounting recess 18. This bottom body 32 is arranged between the permanent magnet 9 and the bottom surface 18a, and pushes all the fragments of the permanent magnet 9 out of the mounting recess 18 at once by operating toward the opening side (lower side).

Therefore, if a bar-shaped guide member 29, for instance, is inserted in the through hole 28 from above and the bottom body 32 is depressed, and assuming that a plurality of fragments are produced inside the mounting recess 18 due to the breakage of the permanent magnet 9, these fragments are all pushed out of the mounting recess 18 at once by the bottom body 32. Accordingly, this makes handling following such breakage easier.

This bottom body 32 may be formed of a non-magnetic material, however, it is preferably formed of a magnetic material. The bottom body 32 formed of a magnetic material in this way can push the fragments produced as a result of breakage of the permanent magnet 9 out of the mounting recess 18 while attracting the fragments using the magnetic force of the permanent magnet 9, enabling a more efficient clean-up of the fragments.

The construction of the rim mounting device 42 according to the fourth embodiment, other than as described above, is the same as in the first embodiment, and therefore, further description thereof is hereby omitted.

Figure 5E:
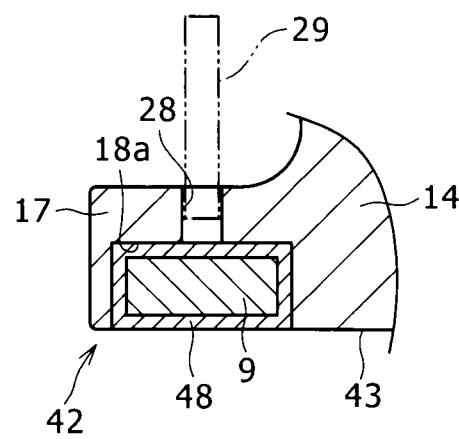

FIG. 5(e) shows a rim mounting device 42 according to a fifth embodiment. This rim mounting device 42 differs from the device according to the first embodiment in that a covering member 48 which covers the entire surface of the permanent magnet 9 is provided as a scatter suppression member. This covering member 48 is made of a non-magnetic material: a synthetic resin such as rubber or elastomer, for instance, or copper or aluminium, and is adapted to protect the permanent magnet 9 from impacts from the exterior by covering the entire surface of the permanent magnet 9. Furthermore, as the fragments produced due to breakage of the permanent magnet 9 are contained inside the covering member 48, fragment scattering is suppressed.

The construction of the rim mounting device 42 according to the fifth embodiment, other than as described above, is the same as in the first embodiment, and therefore, further description thereof is hereby omitted.

In above embodiments, the permanent magnet 9 is mounted in the bottomed mounting recess 18 formed in the upper side mounting surface 43, and the upper rim 4 is attracted using this permanent magnet 9 while performing the surface contact with the upper side mounting surface 43, as an example. However, an upper rim engaging surface section which protrudes downward may be provided at the upper side mounting surface 43, and the upper rim 4 may be mounted on the upper side mounting surface 43 via the upper rim engaging surface section, for example. This mounting structure is preferable as it prevents impacts produced at the time of mounting the upper rim 4 from being transmitted to the permanent magnet 9, and making it possible to prevent breakage of the permanent magnet 9. This is similar as in the following embodiments.

Figure 6:
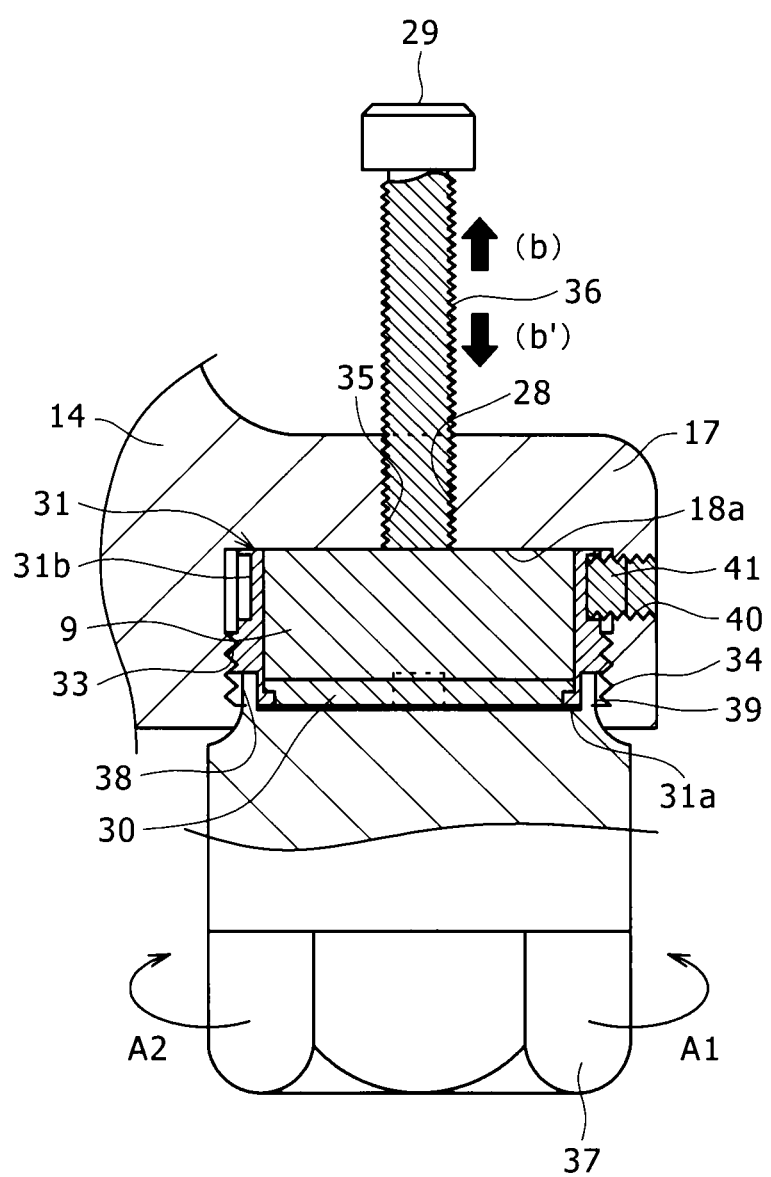
FIG. 6 is a sectional view showing a rim mounting device according to a sixth embodiment of the present invention.

FIG. 6 shows a rim mounting device 42 according to a sixth embodiment of the present invention. The rim mounting device 42 is similar with that in the second embodiment as far as the basic construction is concerned, however, differs therefrom as follows.

a) A lower end section of the case body 31 has a smaller inner diameter than the inner diameter of the other section thereof to constitute a holding section 31a that holds an outer circumferential section of the lid body 30 from an outer side (lower side in this drawing).

b) The outer circumferential surface of the case body 31 and the inner circumferential surface of the mounting recess 18 are formed so as to be capable of their thread engagement. Specifically, a first female screw section 33 is formed on the inner circumferential surface of the mounting recess 18, and a first male screw section 34 that can be screwed into the first female screw section is formed on the outer circumferential surface of the case body 31. Therefore, when the case body 31 is rotated in one direction with respect to the mounting recess 18, the first male screw section 34 of the case body 31 is screwed into the first female screw section 33 of the mounting recess so that the permanent magnet 9 together with the case body 31 is gradually inserted into the mounting recess 18. When the case body 31 is rotated in a reverse direction, the permanent magnet 9 together with the case body 31 is gradually released from the mounting recess 18. As a result, attachment and detachment of the permanent magnet 9 is made possible.

c) A through hole 28 which is a screw hole is formed in the flange 17. A guide member 29 which has a male screw section is screwed into the through hole 28 for its insertion. Specifically, a second female screw section 35 is formed on the inner circumferential surface of the through hole 28, and a second male screw section 36 which can be screwed into the second female screw section 35 is formed on the outer circumferential surface of the guide member 29. Therefore, when the guide member 29 is rotated in either direction with respect to the through hole 28, the second male screw section 36 of the guide member 29 is screwed into the second female screw section 35 of the through hole 28, making it possible to attach or detach the permanent magnet 9 to or from the mounting recess 18 while adjusting the position of the end section of the guide member 29 (lower end section) in a vertical direction with high accuracy. In addition, smaller pitch of the second male screw section 36 and the second female screw section 35 makes it possible to move the guide member 29 up or down with a strong force, even in case of a weak force for rotating the guide member 29. The permanent magnet 9 can be, thus, mounted or detached with respect to the mounting recess 18 against the magnetic force of the permanent magnet 9, even if a strong magnetic force is exerted between the permanent magnet 9 and the bottom section of the mounting recess 18. This also can prevent the guide member 29 from improperly moving in an axial direction (vertical direction).

This case body 31 is inserted in the mounting recess 18 with a lower opening thereof facing the upper rim 4. The end section of the case body 31 on the rim mounting side, that is, the opening side end section (lower end section) has a smaller inner diameter than the inner diameter of the other section of the case body 31. The opening side end section constitutes a holding section 31a which holds the outer circumferential section of the lid body 30 from outside. The lid body 30 is made of a magnetic material and is inserted inside the case body 31 from a side opposite to the holding section 31a (that is, the bottom surface 18a side of the mounting recess 18). The case body 31 encloses the permanent magnet 9 from its radial direction (a direction orthogonal to the direction of the opening of the mounting recess 18) with the inner circumferential surface of the case body 31 being in contact with the outer circumferential surface of the lid body 30.

This lid body 30 has a shape that two circular plates which have different diameters are stacked. Specifically, the lid body 30 has a large diameter section on the permanent magnet 9 side (back side) and a small diameter section which is positioned outside this large diameter section (lower side) and has an smaller outer diameter than the large diameter section. The lid body 30 is mounted inside the case body 31 so that the large diameter section fits to the main body section of the case body 31, that is, a portion which is behind the holding section 31a and the small diameter section fits inside the holding section 31a. The thickness (dimension in a vertical direction) of the small diameter section is set to be equal to or smaller than the thickness (dimension in a vertical direction) of the holding section 31a.

The lid body 30 and the case body 31 can easily be inserted inside the mounting recess 18 with the lid body 30 held from outside by the holding section 31a of the case body 31.

Particularly if the outer circumferential surface of the guide member 29 and the inner circumferential surface of the through hole 28 are shaped to be capable of their thread engagement, and the outer circumferential surface of the case body 31 and the inner circumferential surface of the mounting recess 18 are shaped to be capable of their thread engagement as in the sixth embodiment, the insertion position of the guide member 29 can be adjusted with high accuracy by rotating the guide member 29 with respect to the through hole 28, and also, the insertion position of the case body 31 inside the mounting recess 18 can be adjusted with high accuracy by rotating the case body 31 with respect to the mounting recess 18. Therefore, this permanent magnet 9 can be slowly moved toward the mounting recess 18 while reliably supported by the guide member 29, which can prevent the permanent magnet 9 from strongly hitting the bottom section of the mounting recess 18 and breaking. Furthermore, the thread engagement between the inner circumferential surface of the mounting recess 18 and the outer circumferential surface of the case body 31 prevents the permanent magnet 9 from falling out of the mounting recess 18.

Furthermore, since the guide member 29 which is screwed into the through hole 28 for its insertion can exert a strong extrusion force on the permanent magnet 9 like a screw jack, the permanent magnet 9 is gradually and reliably released from the mounting recess 18 against its magnetic force by rotating the guide member 29 with respect to the through hole 28.

Even when there is either the thread engagement between the outer circumferential surface of the guide member 29 and the inner circumferential surface of the through hole 28 or the thread engagement between the outer circumferential surface of the case body 31 and the inner circumferential surface of the mounting recess 18, the thread engagement makes the mounting operation easier in the present invention.

Furthermore, in the sixth embodiment, a jig 37 may also be removably mounted to the lower end section of the case body 31 (rim mounting side end section) to make the rotating operation of the case body 31 easier. In this case, a plurality (for instance, four) of engaging recesses 38, for example, are formed in the lower side end surface of the case body 31 at equal intervals around the rotary shaft of the guide member 29. The engaging recesses 38 each open upwards and can be engaged with each engaging projection 39 of the jig 37 inserted from under the case body 31. The case body 31 can easily be rotated with respect to the mounting recess 18 by rotating the jig 37, which is engaged in this way, in either one of directions shown by arrow A1 and A2 as shown in FIG. 6.

In the sixth embodiment, a recessed groove 31b is formed in one part of the peripheral wall of the case body 31 so as to extend in a circumferential direction thereof, and a screw hole 40 screwed onto a screw 41, which can engage with the recessed groove 31b, is formed in the flange 17. The engagement between this screw 41 and the recessed groove 31b can prevent the thread engagement between the case body 31 and the mounting recess 18 from coming loose.

In the sixth embodiment, similarly as the fourth embodiment, a bottom plate is added at the bottom part side of the mounting recess so as to come in contact with the opposing end surface of the case body.

In the sixth embodiment, attachment and detachment of the permanent magnet 9 can easily be carried out in the manner shown in FIG. 7(a)~(c), for instance.

When the guide member 29 is rotated in one direction (clock-wise direction in FIG. 6) with respect to the through hole 28, the second male screw section 36 formed on the outer circumferential surface of the guide member 29 is screwed into the second female screw section 35 formed on the inner circumferential surface of the through hole 28, and the guide member 29 moves below. Then, as shown in FIG. 7(a), the end section of the guide member 29 (lower end section) comes in contact with the upper surface of the permanent magnet 9, and the guide member 29 and the permanent magnet 9 are attached due to magnetic force.

Next, as shown in FIG. 7(b), the guide member 29 is rotated in a reverse direction (counter-clockwise direction in FIG. 6) with respect to the through hole 28. While the second male screw section 36 is screwed into the second female screw section 35, the guide member 29 moves upward, and its end section also moves upward. When the jig 37 is rotated in the same direction as the rotating direction of the guide member 29, the first male screw section 34 formed on the outer circumferential surface of the case body 31 which is engaged with the jig 37 is screwed into the first female screw section 33 formed on the inner circumferential surface of the mounting recess 18, the case body 31 move upward while screwed (rotated).

As shown in FIG. 6(c), once the case body 31 is entirely accommodated inside the mounting recess 18, the case body 31 can be fixed inside the mounting recess 18 by inserting the lock pin 41 which is provided in such a manner as to be screwed into the guide hole 40 which extends from a lateral surface of the flange 17 towards the inner circumferential surface of the mounting recess 18.

To detach the permanent magnet 9 which is, thus, inserted in the mounting recess 18, a procedure that is reverse of the mounting procedure may be carried out. Specifically, the guide member 29 which is screwed into the through hole 28 is screwed until an end section of the guide member reaches the bottom section side of the case body 31, and then, the case body 31 which is screwed in the mounting recess 18 is rotated in a direction reverse of the direction in which the case body 31 is screwed into, and the guide member 29 is accordingly rotated in a direction reverse of the direction at the time of mounting, thereby making it possible to remove the case body 31 together with the permanent magnet 9 from the mounting recess 18.

The effects of the combination of the through hole 28 and the guide member 29 are obtained irrespective of whether a scatter suppression member is present or not. Hereinafter, various embodiments employing this combination will be described with reference to the drawings.

The following is the detail of the problems to be solved by the magnet mounting method using the through hole 28 and the guide member 29. Breakage of the permanent magnets 9 and 10 easily occurs at the time of mounting the permanent magnets 9 and 10 in the mounting recesses 18 and 21 of the upper and lower spindles 14 and 16. A case where the upper permanent magnet 9 is mounted in the mounting recess 18 is taken as an example for explanation. As the permanent magnet 9 is brought closer to the bottom section of the mounting recess 18, a strong magnetic force (magnetic attraction force) is produced between the permanent magnet 9 and the bottom section of the mounting recess 18. The permanent magnet 9 can, thus, strongly hit the bottom section of the mounting recess 18, which can cause the permanent magnet 9 made of a brittle material such as ferrite, etc. to break. In addition, the permanent magnet 9 can break when the permanent magnet 9 is accidentally strongly attracted towards the inner circumferential surface of the mounting recess 18 or the surface of the upper spindle 14 at a periphery of an opening section thereof.

When such breakage of the permanent magnet 9 occurs, fragments of the broken magnet are scattered and are magnetically attached to the inner section of the mounting recess 18 or the surface of the upper spindle 14, and it becomes necessary to remove these fragments, which greatly damages the rim replacing operation and furthermore the productivity of various tests of tire. As a magnetic force acts on between the inner side of the mounting recess 18 and the permanent magnet 9 at the time of mounting or detaching the permanent magnet 9, this magnetic force may hinder the permanent magnet 9 from being smoothly inserted or removed with respect to the mounting recess 18. It is, thus, considered that the mounting and detaching operation of the permanent magnet 9 requires a lot of work.

Therefore, in a seventh embodiment as shown in FIG. 8, a through hole 28 is formed so as to extend from a bottom surface 18a of a mounting recess 18 (here, only mounting recess 18 is shown as a representative example of mounting recesses 18 and 21) towards a side opposite to the opening side, and a bar-shaped guide member 29 is inserted in this through hole 28. Then, an end section thereof reaches outside the opening through the bottom surface 18a of the mounting recess 18. Therefore, the mounting of the permanent magnet 9 is performed while the end section of the guide member 29 supports a bottom section side of the permanent magnet 9 against the magnetic attraction force of the permanent magnet 9 acting on the bottom section.

Also in this embodiment, the through hole 28 has a linear shape vertically connecting the bottom surface of the mounting recess 18 with the upper surface of the flange 17 or 20, and has a smaller hole diameter than the inner diameter of the mounting recess 18 and the outer diameter of the permanent magnet 9. Specifically, since the through hole 28 has a hole diameter which prevents the passage of the permanent magnets 9 and 10 inserted in the mounting recesses 18 and 21, the permanent magnets 9 and 10 are prevented from falling out through the through hole 28.

The guide member 29 is formed into a bar shape with a diameter allowing its insertion into the through hole 28. The guide member 29 is inserted into the through hole 28 from a side vertically opposite to the opening of the mounting recess 18 or 21 so that an end section of the guide member 29 supports the permanent magnet 9 or 10 from a bottom section side, with the end section projecting inside the mounting recess 18 or 21 or out of the opening. The guide member 29 according to this embodiment is formed of a magnetic material which attracts a bottom section of the permanent magnet 9 or 10 using the magnetic force generated by the permanent magnet 9 or 10. The permanent magnets 9 and 10 can be, accordingly, inserted inside the mounting recesses 18 and 21, with a bottom section thereof being attracted to the end section of the guide member 29. The concrete material of the guide member 29 may be a metallic material corresponding to a magnetic material or a magnet which has a different polarity from the bottom section side of the permanent magnets 9 and 10.

Next, a description will be given of a method for mounting the permanent magnets 9 and 10 in the mounting recesses 18 and 21 in the flanges 17 and 20, in the sixth embodiment. In the following description, the upper permanent magnet 9 is inserted in the mounting recess 18 formed in the flange 17 of the upper spindle 14, as a representative example. However, the same method is used when the lower permanent magnet 10 is inserted in the mounting recess 21 formed in the flange 20 of the lower spindle 16.

As shown in FIG. 8(a), a mounting recess 18 opens downward in the flange 17 of the upper spindle 14. Before the upper permanent magnet 9 is inserted in this mounting recess 18, the guide member 29 is downward inserted into the through hole 28 from its upper opening section. As a result of this insertion, the end section of the guide member 29 projects inside the mounting recess 18 as shown in FIG. 8(b). Furthermore, the end section of the guide member 29 projecting outside the mounting recess 18 through the opening section of the mounting recess 18 attracts the bottom section of the permanent magnet due to the magnetic force generated by the permanent magnet 9. In this state, by supporting an end section of the guide member 29 on a side opposite to the permanent magnet 9 side, the bottom surface 18a of the mounting recess 18 can support the permanent magnet 9 from a bottom section side of the permanent magnet 9 against the attracting force of its magnetic force.

Thereafter, as shown in FIG. 8(c), the force that the bottom surface 18a of the mounting recess 18 attracts the permanent magnet 9 using its magnetic force becomes stronger as the permanent magnet 9 is gradually brought closer to the bottom section side of the mounting recess 18. However, since the permanent magnet 9 is supported by the end section of the guide member 29 from a bottom section side of the permanent magnet 9 as described above, the permanent magnet 9 can be slowly inserted into the mounting recess 18 against the magnetic force acting on the bottom section of the mounting recess 18. That is, since the permanent magnet 9 is supported by the guide member 29 until a bottom section of the permanent magnet 9 reaches the bottom surface 18a of the mounting recess 18, it is possible to prevent the permanent magnet 9 from strongly hitting the bottom surface 18a and breaking.

When the permanent magnet 9 is brought closer to the mounting recess 18 while being supported by the guide member 29 in this way, the magnetic force acts on between the permanent magnet 9 and the inner circumferential surface of the mounting recess 18 and the periphery around an opening section in the upper spindle 14. However, if the guide member 29 is made of a magnetic material mutually attracting the bottom section side of the permanent magnet 9 to each other, the attraction of the end section of the guide member 29 for the permanent magnet 9 can suppress a horizontal shift of the permanent magnet 9 from the end section, thereby allowing the permanent magnet 9 to be smoothly and easily inserted.

To detach the permanent magnet 9 which is inserted in the mounting recess 18, a procedure that is reverse of the mounting procedure may be carried out. Specifically, the bar-shaped guide member 29 may be inserted into the through hole 28 until an end section thereof reaches the bottom section of the permanent magnet 9, and then a bottom section side of the permanent magnet 9 may be pushed down by the end section of the guide member 29 against the magnetic force of the permanent magnet 9. Even if the permanent magnet 9 is tightly attached to the bottom surface 18a of the mounting recess 18 by its magnetic force, this method makes it possible to easily detach the permanent magnet 9 from the mounting recess 18 against the attraction force.

Next, magnet mounting methods and magnet removal methods according to an eighth embodiment~tenth embodiment will be described.

Figure 9A:
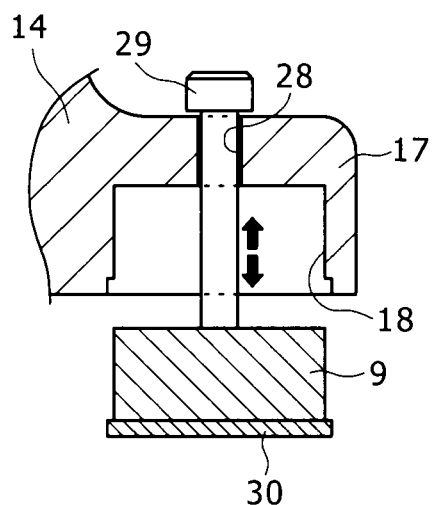
FIGS. 9 (a) and (b) are explanatory diagrams showing a magnet mounting method and a magnet removal method according to an eighth embodiment of the present invention.
Figure 9B:
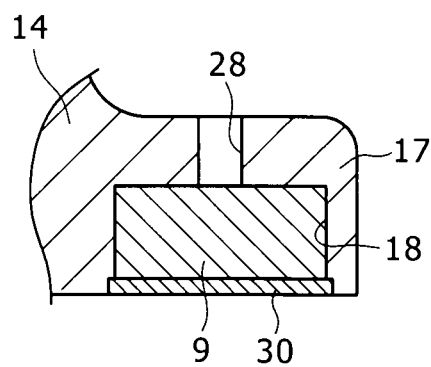
Figure 10A:
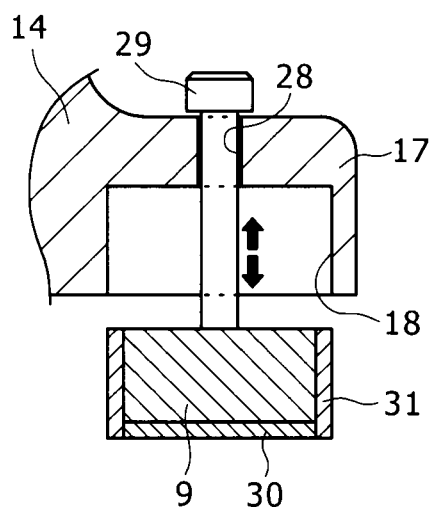
FIGS. 10 (a) and (b) are explanatory diagrams showing a magnet mounting method and a magnet removal method according to a ninth embodiment of the present invention.
Figure 10B:
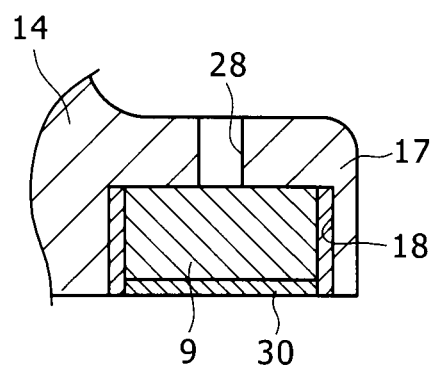
Figure 11A:
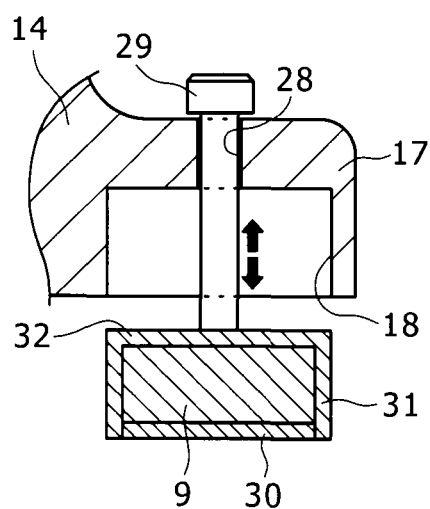
FIGS. 11 (a) and (b) are explanatory diagrams showing a magnet mounting method and a magnet removal method according to a tenth embodiment of the present invention.
Figure 11B:
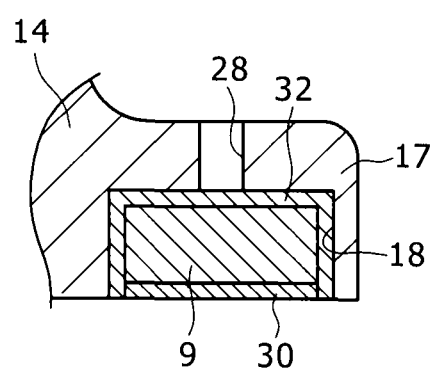

In the seventh embodiment, only the permanent magnet 9 itself is mounted/detached to/from the mounting recess 18, while in the eight~tenth embodiments as shown in FIG. 9~FIG. 11, respectively, the lid body 30, the case body 31 and/or the bottom body 32 are added, which makes the mounting/detaching operation of the permanent magnet 9 easier.

More specifically, in the eighth embodiment, a lid body 30 as shown in FIG. 9(a) (b) is employed. The lid body 30 is adapted to prevent the surface of the permanent magnet 9 which faces the upper rim 4 from coming in direct contact with the upper rim 4. The lid body 30 is a plate member able to be arranged on a surface of the permanent magnet 9 on a side of the opening of the mounting recess 18. In this embodiment, the lid body 30 is formed of a magnetic body which is magnetically attracted to the permanent magnet 9. More specifically, the lid body 30 is attracted to the surface of the permanent magnet 9 through its magnetic force so that the lid body 30 is moved together with the permanent magnet 9 at the time of mounting and removal.

A lid body 30 according to an eighth embodiment has an outer diameter which is slightly larger than the outer diameter of the surface of the permanent magnet 9, and the inner diameter of an opening side end section of the mounting recess 18 is accordingly set so as to be larger than the inner diameter of is main body section behind the end section. More specifically, the mounting recess 18 according to this embodiment has a difference in level between its lower end section (opening side end section) and a main body section behind the lower end section. And the permanent magnet 9 is fitted in the main body section at the back of the mounting recess 18, while the lid body 30 is fitted in the opening side end section. The lid body 30 which is fitted as described above can seal the permanent magnet 9 inside the mounting recess 18. Thus, when the permanent magnet 9 is broken by impact applied from outside at the time of rim mounting/removal, its fragments can be suppressed from scattering from the inside of the mounting recess 18. Furthermore, the lid body 30 also has the role of alleviating an impact at the time of rim mounting/removal, which results from breakage of the permanent magnet 9, by inhibiting a direct contact between the permanent magnet 9 and the upper rim 4.

A magnet mounting method and a magnet removal method according to the eighth embodiment will be as follows.

First, with respect to mounting of the permanent magnet 9, as shown in FIG. 9(a), the permanent magnet 9 together with the lid body 30 magnetically attached to the magnet is inserted into the mounting recess 18 while being supported from bottom section side by an end section of the guide member 29. When the permanent magnet 9 is inserted in the main body section at the back of the mounting recess 18 while being supported by the guide member 29 in this way, the lid body 30 is simultaneously fitted in an opening side end section (large diameter portion) of the mounting recess 18 to cover the permanent magnet 9 (FIG. 9(b)). That is, the permanent magnet 9 and the lid body 30 are mounted simultaneously.

To remove the permanent magnet 9 from the mounting recess 18, a bar-shaped guide member 29 may be inserted into the through hole 28. An end section of the guide member 29 thus inserted reaches a bottom section of the permanent magnet 9, and further pushes down the bottom section of the permanent magnet 9 against the magnetic force of the permanent magnet 9, thereby removing the permanent magnet 9 together with the lid body 30, which is attached thereto, from the mounting recess 18.

At this removal, even when fragments are generated from break of the permanent magnet 9 due to an impact from outside, such as an impact at the time of rim attaching/detaching, the lid body 30 can effectively suppress scatter of these fragments to the outside of the mounting recess 18.

In the eighth embodiment, although the lid body 30 and the permanent magnet 9 are integrally mounted/removed with respect to the mounting recess 18, they may also be individually mounted/removed. In this case, for mounting the permanent magnet 9 in the flange 17, first, the permanent magnet 9 may be inserted in the main body section at the back of the mounting recess 18, and then, the lid body 30 may be fitted in an opening side end section of the mounting recess 18.

Alternatively, the thickness of the lid body 30 may be set so that a lower surface of the lid body 30 fitted in an opening-side end section of the mounting recess is positioned slightly above (at the back side of the mounting recess 18) the surface of the flange 17 of the upper spindle 14. In this structure, a clearance is ensured between the upper rim 4 and the surface of the lid body 30 even if the upper rim 4 comes in contact with the lower surface of the flange 17. This clearance can further reduce the impact at the time of mounting/removing, which is transmitted from the upper rim 4 to the permanent magnet 9 through the lid body 30.

In a magnet mounting method and magnet removal method according to a ninth embodiment as shown in FIG. 10 (a) (b), a case body 31 is employed, in addition to the lid body 30, the case body 31 being adapted to enclose this lid body 30 and permanent magnet 9 to prevent them from coming in direct contact with the inner circumferential surface of the mounting recess 18.

The case body 31 is formed into a cylindrical shape with an inner diameter larger than the outer diameter of the permanent magnet 9, and can move together with the permanent magnet 9 housed therein. The vertical dimension of this case body 31 is larger than that of the permanent magnet 9 by the thickness of the lid body 30. The case body 31 can, consequently, enclose the lid body 30 and the permanent magnet 9, which are stacked and are made of a magnetic material, from outside in their radial direction (outside in a direction orthogonal to the direction of the opening in the mounting recess 18).

This case body 31 is made of a non-magnetic material such as synthetic resin, stainless steel, aluminum or copper, so that no magnetic force is generated between this case body 31 and the permanent magnet 9. Therefore, when this case body 31 and the permanent magnet 9 enclosed therein are inserted in the mounting recess 18, a magnetic force generated between the permanent magnet 9 and the inner circumferential surface of the mounting recess 18, and a periphery of an opening section in the flange 17 becomes weaker by an amount corresponding to the thickness of the case body 31 which is made of a non-magnetic material, thereby preventing the magnetic force from inhibiting the insertion operation of the permanent magnet 9 into the mounting recess 18. Since the case body 31 made of such non-magnetic material encloses the lid body 30 and the permanent magnet 9 that are made of magnetic materials, the magnetic force of the permanent magnet 9 acts strongly toward the upper rim 4 side (lower side), thereby allowing the upper rim 4 to be more strongly magnetically attached to the flange 17 of the upper spindle 14. Furthermore, even in the event that the permanent magnet 9 breaks due to an impact from outside, such as an impact at the time of rim mounting/removal time, fragments generated from such breakage are prevented from being scattered to the outside of the mounting recess.

A magnet mounting method and a magnet removal method according to a ninth embodiment will be described below.

First, at the time of mounting, the permanent magnet 9 together with the case body 31, which encloses this magnet, is inserted in the mounting recess 18 while the permanent magnet 9 is supported from its bottom section side by an end section of the guide member 29, as shown in FIG. 10(*a*). Here, the case body 31 together with the permanent magnet 9 can be inserted into the mounting recess 18, while positioning between the outer circumferential surface of the permanent magnet 9 and the inner circumferential surface of the mounting recess 18. At the time of removing the permanent magnet 9 from the mounting recess 18, the bar-shaped guide member 29 may be inserted into the through hole 28. As a result of this insertion, an end section of the guide member 29 reaches a bottom section of the permanent magnet 9, and further, can detach the case body 31 together with the permanent magnet 9 from the mounting recess 18, while pushing down the bottom section of the permanent magnet 9 against the magnetic force of the permanent magnet 9.

The case body 31 made of a non-magnetic material, which is inserted/removed together with the permanent magnet 9 with respect to the mounting recess 18 in this way, weakens the magnetic force which is generated between the permanent magnet 9 and the inner circumferential surface of the mounting recess 18 and a periphery of the opening section by an amount corresponding to the thickness of the case body 31, thereby making it possible to easily mount/remove the permanent magnet 9.

The lid body 30, the case body 31, and the permanent magnet 9 may not integrally be inserted into the mounting recess 18 as in the ninth embodiment 9, but they may be individually inserted into the mounting recess 18. For instance, advance mounting of the case body 31 to the inner circumferential surface of the mounting recess 18 makes insertion/removal of the permanent magnet 9 with respect to the mounting recess 18 smoother, thus making the mounting/removal operation of the permanent magnet 9 easier.

In a magnet mounting method and a magnet removal method according to a tenth embodiment as shown in FIG. 11(*a*) (*b*), a bottom body 32 is employed, in addition to the lid body 30 and the case body 31, for preventing the bottom surface 18*a* of the mounting recess 18 from coming into direct contact with a bottom surface of the permanent magnet 9. This bottom body 32 is a plate member which can be arranged on the bottom section of the permanent magnet 9, and, in the present embodiment, is made of a non-magnetic material. The bottom body 32 is formed integrally with the case body 31 as described above. Thus, at the time of mounting/removing the permanent magnet 9, the bottom body 32 moves together with (integrally with) the permanent magnet 9 while covering a bottom surface side of the permanent magnet 9, so as to be mounted or removed with respect to the mounting recess 18. The bottom body 32 which is made of a non-magnetic material, and is inserted together with the permanent magnet 9 into the mounting recess 18 in this way weakens the magnetic force produced between a bottom surface of the mounting recess 18 and the permanent magnet 9 by an amount corresponding to the thickness of the bottom body 32, thereby making it possible to more easily mount/remove the permanent magnet 9 while preventing breakage of the permanent magnet 9.

A magnet mounting method and a magnet removal method according to a tenth embodiment will be as follows.

First, at the time of mounting the permanent magnet 9 in the mounting recess 18, the case body 31, the bottom body 32, which is integrally formed therewith, and the permanent magnet 9, which are integral with each other, are inserted in the mounting recess 18, while the permanent magnet 9 is supported from its bottom section side by an end section of the guide member 29, as shown in FIG. 11(*a*). At the time of removing the permanent magnet 9 from the mounting recess 18, a bar-shaped guide member 29 is inserted into the through hole 28. As a result, an end section of the guide member 29 reaches the bottom body 32, and further, detaches the bottom body 32 together with the permanent magnet 9 from the mounting recess 18, while pushing down the bottom body 32 against the magnetic force of the permanent magnet 9.

Thus, even in the event the permanent magnet 9 breaks as a result of an impact from outside, such as an impact at the time of rim mounting/removal, the lid body 30 effectively suppresses scatter of broken magnet fragments to the outside of the mounting recess 18. Further, these fragments together with the case body 31 and the bottom body 32 can be removed from the mounting recess 18, which means that it is no longer necessary to use additional labor to dispose of the permanent magnet 9 fragments, enabling a more efficient insertion/removal operation of the permanent magnet 9.

With respect to the lid body 30, the case body 31 and the bottom body 32 according to the eighth~tenth embodiments as described above, at least one of them may be mounted in advance on the permanent magnet 9, or alternatively, all of them may be mounted in advance on the permanent magnet 9. In case plural elements among the lid body 30, case body 31 and bottom body 32 are mounted on the permanent magnet 9, it is preferable that one of these elements is made of a magnetic material, while the remaining elements is made of a non-magnetic material. With this construction, even if the permanent magnet 9 breaks, the element which is made of a magnetic material attracts the resulting broken fragments, making it easy to remove the fragments from the mounting recess 18.

In addition, a method of fixing the case body 31 to the mounting recess 18, and a method of fixing the case body 31 to the lid body can be appropriately selected from methods including adhesion, welding, screwing or thread engagement.

In the case the permanent magnet 9 is inserted inside the mounting recess while being guided by the guide member 29, the lid body 30, the case body 31 or the bottom body 32 may not necessarily be mounted in advance with respect to the permanent magnet.

Next, a magnet mounting method and a magnet removal method according to the eleventh embodiment will be described.

Figure 12A:
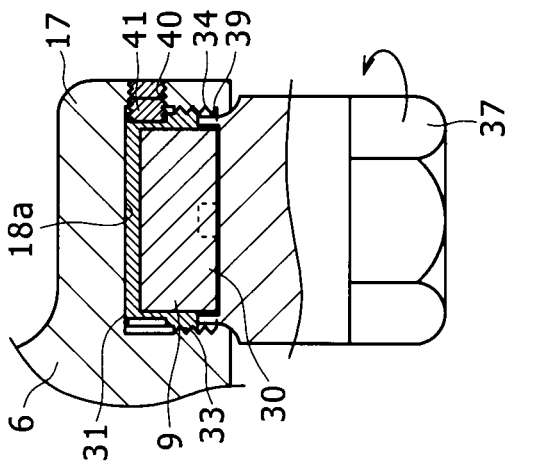
FIG. 12 (a)~(c) are explanatory diagrams showing a magnet mounting method and a magnet removal method according to an eleventh embodiment of the present invention.
Figure 12B:
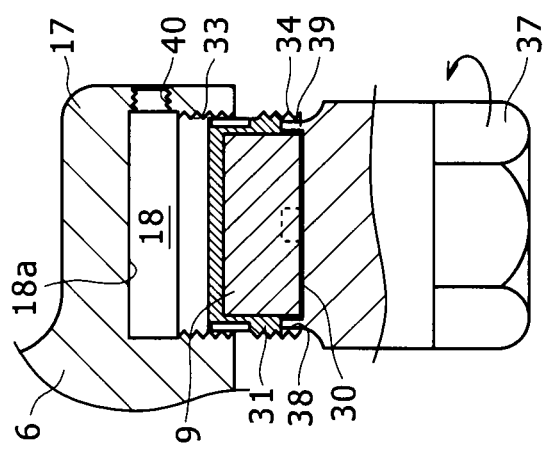
Figure 12C:
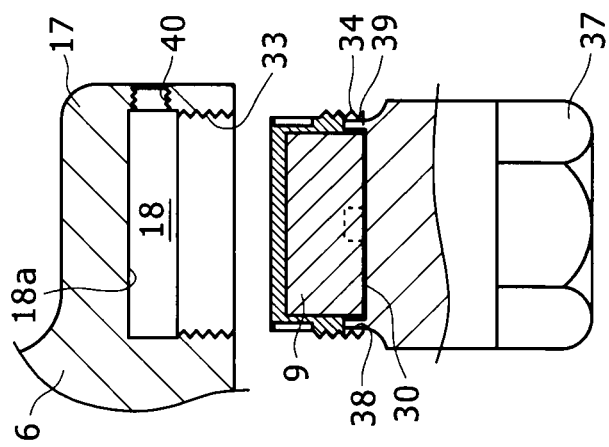

Unlike the seventh embodiment through the tenth embodiment, in the magnet mounting method and the magnet removal method according to the eleventh embodiment, as shown in FIG. 12(a)~(c), a guide member 29 for supporting the permanent magnet 9 from a bottom section side thereof is not employed, and a through hole 28, into which the guide member 29 is inserted, is not formed in the flange 17.

On the one hand, a case body 31 is used for preventing the permanent magnet 9 from coming into direct contact with the inner circumferential surface and the bottom surface of the mounting recess 18. This case body 31 is formed to have a bottomed cylindrical shape having a bottom section at a bottom surface 18a side of the mounting recess 18. A first female screw section 33 is formed on the inner circumferential surface of the mounting recess 18, and a first male screw section 34, which is adapted to be screwed into the first female screw section 33, is formed in the outer circumferential surface of the case body 31.

As in the sixth embodiment, four engaging recesses 38 are formed in a lower side end surface of the case body 31 at equal intervals around a rotary shaft of the case body. These engaging recesses 38 are formed to open upwards, and a removable jig 37 is provided for rotating the case body 31.

In case of mounting the permanent magnet 9 in the mounting recess 18, the case body 31 is rotated in one direction with respect to the mounting recess 18. As a result, the first male screw section 34 of the case body 31 is screwed into the first female screw section 33 of the mounting recess 18, and the case body 31 is moved upwards, whereby the permanent magnet 9 together with the case body 31 is inserted inside the mounting recess 18. In case of removing the permanent magnet 9 from the mounting recess 18, the case body 31 is rotated in a reverse direction of the direction described above. Such rotation makes it possible to move the case body 31 and the permanent magnet 9 while the permanent magnet 9 is supported by the case body 31 against the force with which the bottom surface 18a of the mounting recess 18 attracts the permanent magnet 9. More specifically, the permanent magnet 9 is supported by the case body 31 until it reaches the bottom surface 18a of the mounting recess 18, which prevents the permanent magnet 9 from strongly hitting the bottom section and breaking. Also, since the permanent magnet 9 housed in the case body 31 can be removed from the mounting recess 18 while the case body 31 is rotated, the permanent magnet 9 is prevented from sloping with respect to the mounting recess 18 at the time of removal thereof, which improves workability.

Although the lid body is not provided in the eleventh embodiment, a lid body may be provided as in the other embodiments as described above. In addition, the thread engagement between the outer circumferential surface of the case body 31 and the inner circumferential surface of the mounting recess 18, and the thread engagement between the outer circumferential surface of the guide member 29 and the inner circumferential surface of the through hole 28, both of which are disclosed in this eleventh embodiment and the above sixth embodiment, can also be applied to the seventh embodiment~tenth embodiment, for instance.

Although the above-described embodiments shows cases where a guide member 29 is made of a magnetic material, as examples, the guide member 29 may be made of a non-magnetic material.

For explaining the magnet mounting method and magnet removal method, the sixth~eleventh embodiments show that upper permanent magnets 9 are mounted/removed with respect to the mounting recesses 18 formed in the flange 17 of the upper spindle 14, as examples. However, the magnet mounting method and the magnet removal method of the present invention can also be used for mounting/removing the lower permanent magnets 10 with respect to the mounting recesses 21 formed in the flange 20 of the lower spindle 16. Similarly, the rim mounting device 42 as shown in the first~fifth embodiments is not only applied to the rim mounting device in which the upper permanent magnets 9 are mounted in the mounting recesses 18 of the upper spindle 14, but also to a rim mounting device in which the lower permanent magnets 10 are mounted in the mounting recesses 21 of the lower spindle 16.

In addition, the shape, construction, material, or combination of the respective members can be appropriately changed for the rim mounting device of the present invention, without departing from the spirit of the present invention.

For instance, in the above embodiments, the permanent magnet 9 is formed in a cylindrical shape, and a mounting recess 18, in which the permanent magnet 9 is mounted, is formed in a bottomed cylindrical shape, as examples. However, the shape of the permanent magnet 9 is not limited to a cylindrical shape, and the shape of the mounting recess 18 is also appropriately changed so as to correspond to the shape of the permanent magnet 9. If the permanent magnet 9 has a polygonal shape, for instance, the mounting recess 18 may be formed in a bottomed polygonal shape.

In the present invention, the specific methods for fixing the flange and the lid body, the flange and the case body, and the case body and the lid body are not limited in particular. For instance, a screw section may be formed on an inner periphery of the mounting recess of the flange and on the outer periphery of the lid body for their thread engagement, or the lid body may be fixed in the mounting recess of the flange through an adhesive or the like. The fixation between the flange and the case body, and the fixation between the case body and the lid body are performed in the same way.

Next, a rim replacing device according to a twelfth embodiment of the present invention will be described while referring to FIG. 1~FIG. 4 and FIG. 13. Since all the constituent elements as shown in FIG. 1~FIG. 4 are the same as the constituent elements as described in the first embodiment, a detailed description thereof is omitted below, except the elements related to rim replacement (in particular, detaching device 50).

The upper rim replacing device 11 as shown in FIG. 2 (refer to FIG. 2) is used for replacing the upper rim 4 with respect to the upper spindle 14, while the lower rim replacing device 12 as shown in FIG. 4 is used for replacing the lower rim 5 with respect to the lower spindle 16. The upper and lower rim replacing devices 11 and 12 are provided with the above-described permanent magnets 9 and 10, respectively. At the time of mounting the upper and lower rims 4 and 5, first, the lower rim 5 is attached to the lower spindle 16 due to the magnetic force of the lower permanent magnets 10 provided in the lower rim replacing device 12. Next, the lower spindle 16 is extended upwards, and the upper rim 4 is consequently attached to the upper spindle 14 due to the magnetic force of the upper permanent magnets 9 provided in the flange 17 of the upper spindle 14.

On the one hand, detachment of the lower rim 5 from the lower spindle 16 is implemented by mounting the lower rim 5 on an upper surface of the lower rim replacing device 12 and controlling the lower rim replacing device 12 not to move downward, and causing only the lower spindle 16 under the above controlled state to move toward below the lower rim replacing device 12. With respect to the upper rim 4, however, since the upper spindle 14 is fixed not to move in a vertical direction, a detaching method using the movement of the spindle as in the detachment of the lower rim 5 cannot be used.

Here, the upper rim replacing device 11 according to this embodiment has a detaching device 50 which depresses the upper rim 4 which is magnetically attached to the permanent magnet 9 to forcibly detach it from the upper spindle 14. As shown in FIG. 2 and FIG. 3, this detaching device 50 is adapted to press the upper surface of the upper rim 4 downwards with a force which surpasses a force with which the upper permanent magnet 9 attracts the upper rim 4 towards the upper spindle 14 at a position radially outward remote from the upper spindle 14. More specifically, this detaching device 50 has a bracket 25 which hangs down from the upper frame 3a at a position radially outward remote from the upper spindle 14, actuators 26 which are provided in a lower section of this bracket 25, and pressing rods 51 which are driven by the actuators 26 to depress the upper rim 4.

The bracket 25 is formed to have a cylindrical shape so as to encompass the periphery of the upper spindle 14. The bracket 25 is preferably formed to have a cylindrical shape due to a variety of aspects, such as facilitating productivity, low cost, higher flexibility in changing actuator arrangement, easier position adjusting with respect to the upper spindle 14, etc., however, the shape of the bracket 25 is not necessarily limited to this cylindrical shape. For instance, a plurality of brackets 25 corresponding to the number of actuators 26 may be formed to have a plate-shape, a bar-shape, or the like and provided at a plurality of locations arrayed in a circumferential direction.

The actuator 26 includes, for example, an air cylinder or the like capable of generating a downward pressing force. The number of actuators 26 which are provided is conveniently set in accordance with the total number of permanent magnets 9 and the intensity of the magnetic force which is generated by each permanent magnet 9. For instance, in the example shown in FIG. 13, three actuators 26 are arranged at equal intervals in a circumferential direction (in the example in FIG. 3, 120° intervals) and are adjusted so as to operate in synchronicity with each other. These actuators 26 may be hydraulic cylinders, or may be electrical actuators which output a downward pressing force, with the electrical motor acting as power source.

Each pressing rod 51 constitutes a pressing member according to the present invention, is shaped in a round bar or a polygonal bar (square bar-shaped or hexagonal bar-shaped), is mounted on the upper rim 4 side of the actuator 26, and is adapted to transfer the pressing force generated by the actuator 26 to the upper surface of the upper rim 4, whereby a lower end section of the pressing rod 51 depresses the upper rim 4. More specifically, the pressing rods 51 are coupled to operating sections, which are adapted to lift and lower in the actuators 26, and lower end sections of this pressing rods 51 depress the upper rim 4, which is held by the upper spindle 14, at positions radially outward remote from the outer periphery of the upper spindle 14 having a flange 17, in which permanent magnets 9 are mounted. In an upper rim replacing device 11 having a construction as described above, an upper rim 4 detaching operation is carried out as will be described later.

First, the actuators 26 of the detaching device 50 operate, and thereby a downward pressing force, which surpasses a magnetic force of the permanent magnet 9 attracting the upper rim 4 toward the upper spindle 14, is transmitted to the upper side of the upper rim 4 through the pressing rods 51, causing the upper rim 4 to reliably and swiftly detach from the upper spindle 14.

In the upper rim replacing device 11, the position where the detaching device 50 (pressing rod 51 of the actuator 26) depresses the upper rim 4 is set to a position that is radially outside remote from the flange 17 of the upper spindle 14, in which the permanent magnets 9 are mounted. Thus, irrespective of the number and mounting position of the permanent magnets 9 provided in the upper spindle 14, it is possible to avoid interference between the permanent magnets 9, and the actuators 26 and pressing rods 51 which constitute the detaching device 50. Accordingly, the number of permanent magnets 9 can be raised, or otherwise a large-size magnet can be used as the permanent magnet 9 for stronger magnetic attraction, without causing this interference. As a result, this intensifies the force with which the upper spindle 14 attracts the upper rim 4, making it possible to reliably secure a large diameter heavyweight upper rim 4 to the upper spindle 14.

In the upper rim replacing device 11, the actuator 26 and the bracket 25 of the detaching device 50 are not fixed to the upper spindle 14, but fixed to the upper frame 3a which supports the upper spindle housing 6 holding the upper spindle 14, which means that the detaching device 50 will not rotate in response to the rotating of upper spindle 14 during the tire testing operation. Accordingly, an error component resulting from rotation of the detaching device 50 during the tire testing operation will not act on a uniformity measuring system, whereby uniformity measuring will be carried out with high accuracy.

Next, a thirteenth embodiment of the present invention will be described while referring to FIG. 14.

The biggest difference between the upper rim replacing device 11 according to the present embodiment and the one in the first embodiment lies in the fact that the pressing rod 51 which is provided at a lower side of the actuator 26 has a tapered shape towards a lower end thereof. In the example shown in the drawing, an outer side surface in a radial direction from amongst a plurality of side surfaces of the pressing rod 51 is formed as an inclined surface which is inclined towards an inner side in a radial direction towards a lower end thereof. More specifically, the pressing rod 51 has a wedge shape (inverted trapezoid-shape), with the width in a radial direction thereof becoming smaller from an upper end side towards a lower end side, and the lower end thereof which has a smaller area as compared to its upper end comes in direct contact with the upper rim 4 and depresses it. Thus, when a pressing rod 51 with a small lower end section area is employed, it becomes possible to reliably depress even a small-diameter upper rim 4 for which it is difficult to ensure a depressing location, and such a pressing rod can also be employed with respect to small-diameter rims such as 12 inch-sized rims, etc.

The specific shape of this pressing rod 51 is not limited to the shape shown in the drawings. For instance, the pressing rod 51 may have a wedge shape wherein not one side surface but both side surfaces are inclined so that a width thereof becomes narrower. Alternatively, the rod may also have a reverse conical shape, or a reverse stepped shape wherein a cross sectional area thereof becomes smaller in a step-wise fashion towards a lower side thereof.

Figure 15:
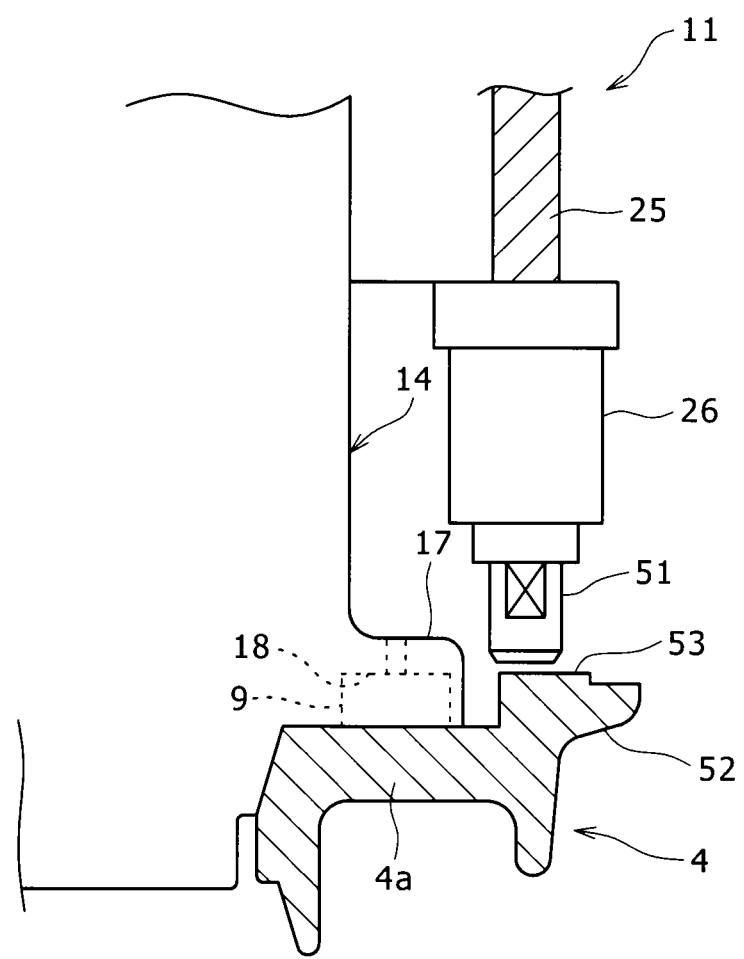
FIG. 15 is a partially sectioned front view showing a main part of an upper rim replacing device according to a fourteenth embodiment of the present invention.

A fourteenth embodiment of the present invention will next be described while referring to FIG. 15.

According to this embodiment, in addition to the to-be-attracted part 4a which is to be attracted to the upper spindle 14 due to the magnetic force generated by the permanent magnet 9, an upper rim 4 which is operated by an upper rim replacing device 11 also has a rim outer circumferential section 52 which is positioned radially outward with respect to the to-be-attracted part 4a so as to support a bead section of a tire T. Furthermore, this upper rim 4 also has a depressed surface 53 which is positioned between the to-be-attracted section 4a and the rim outer circumferential section 52 and above an upper surface of these two sections, and is adapted to receive a downward pressing force from an actuator 26 at its height position.

In case an upper rim 4 including such a depressed surface 53 is used, the upper rim 4 can be reliably depressed using the depressed surface 53 as a target, even if an outer diameter thereof is small, and an area thereof at outside the flange 17, more specifically, an area wherein a depressing position can be secured is small. Furthermore, as a pressing force of actuators 26 is applied to the depressed surface 53 which is positioned above the upper surface of the rim outer circumferential surface 52, it is possible to prevent deformations in the rim outer circumferential section 52 caused by the pressing force acting directly on the rim outer circumferential section 52. Further, if a plurality of upper rims 4 including the depressed surface 53 are formed so as to have a shape that maintains a regular elevating stroke of the respective actuators 26, more specifically, so as to have a shape making a height position of the depressed surface 53 constant, a cumbersome operation for adjusting the stroke of actuators 26 each time the upper rim 4 is replaced is no longer necessary, which allows for an efficient rim replacing operation.

Figure 13:
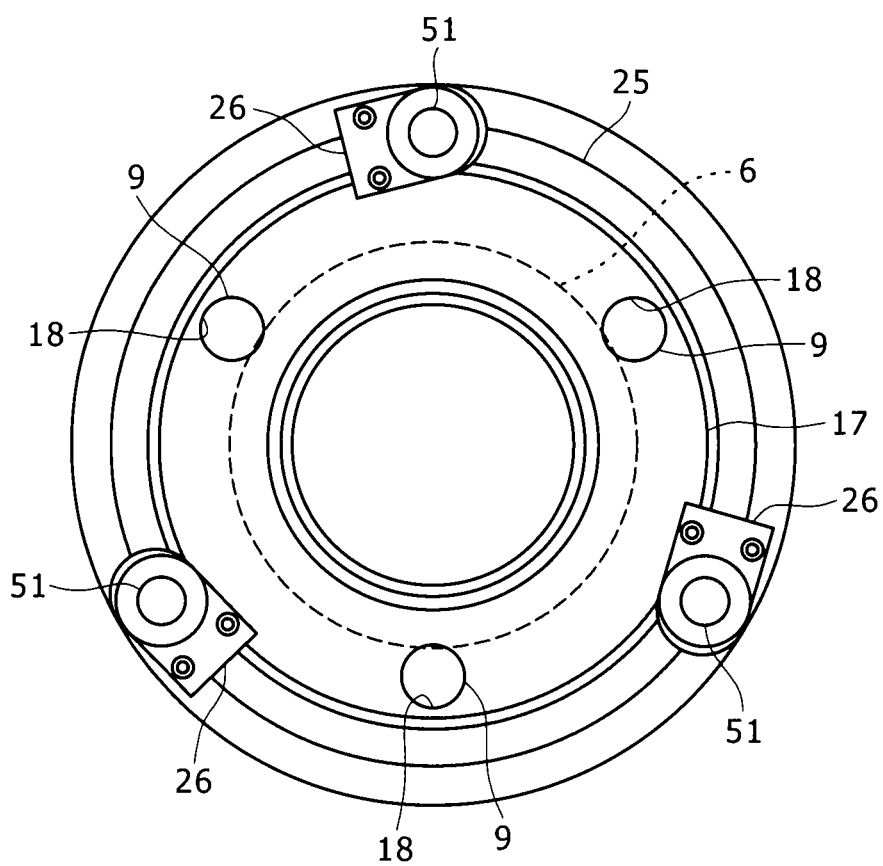
FIG. 13 is a bottom plan view showing an upper rim replacing device according to a twelfth embodiment of the present invention, corresponding to a perspective view taken along the XIII-XIII line in FIG. 2.
Figure 14:
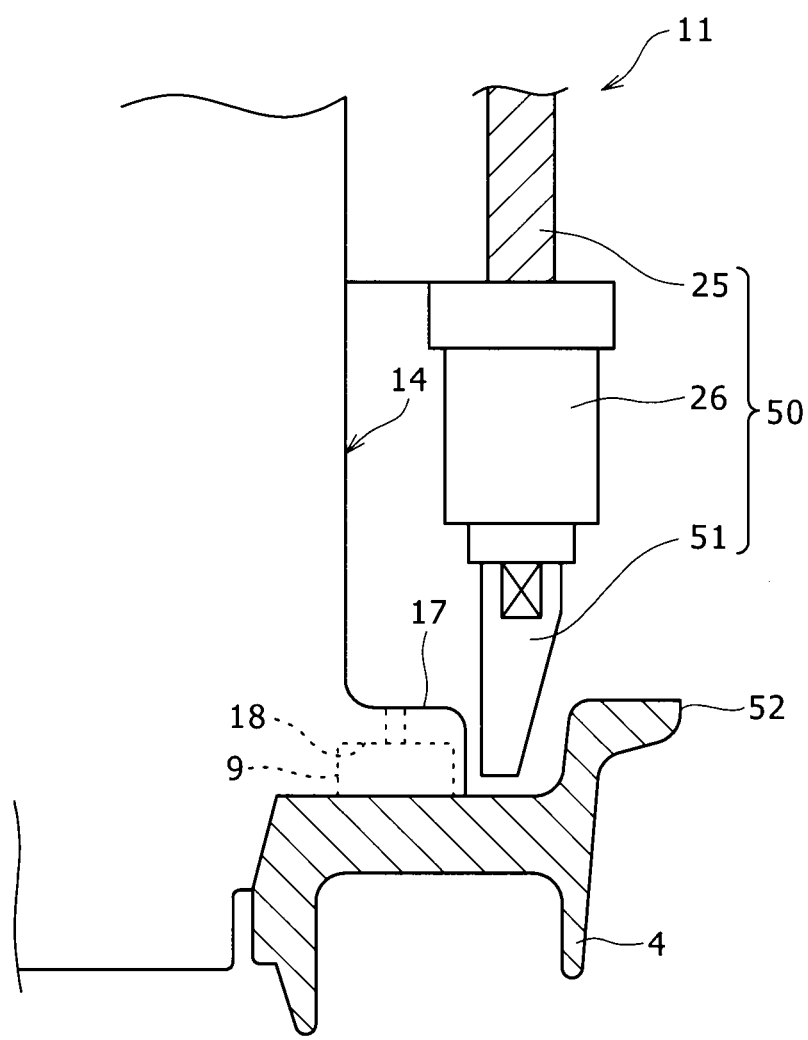
FIG. 14 is a partially sectioned front view showing a main part of an upper rim replacing device according to a thirteenth embodiment of the present invention.

An combination of the rim outer circumferential section 52 and the depressed surface section 53 can also be applied to an upper rim 4 which is depressed by the pressing rod 51 according to the twelfth embodiment as shown in FIG. 13, and also to an upper rim 4 which is depressed by the pressing rod 51 according to a thirteenth embodiment as shown in FIG. 14.

Figure 16:
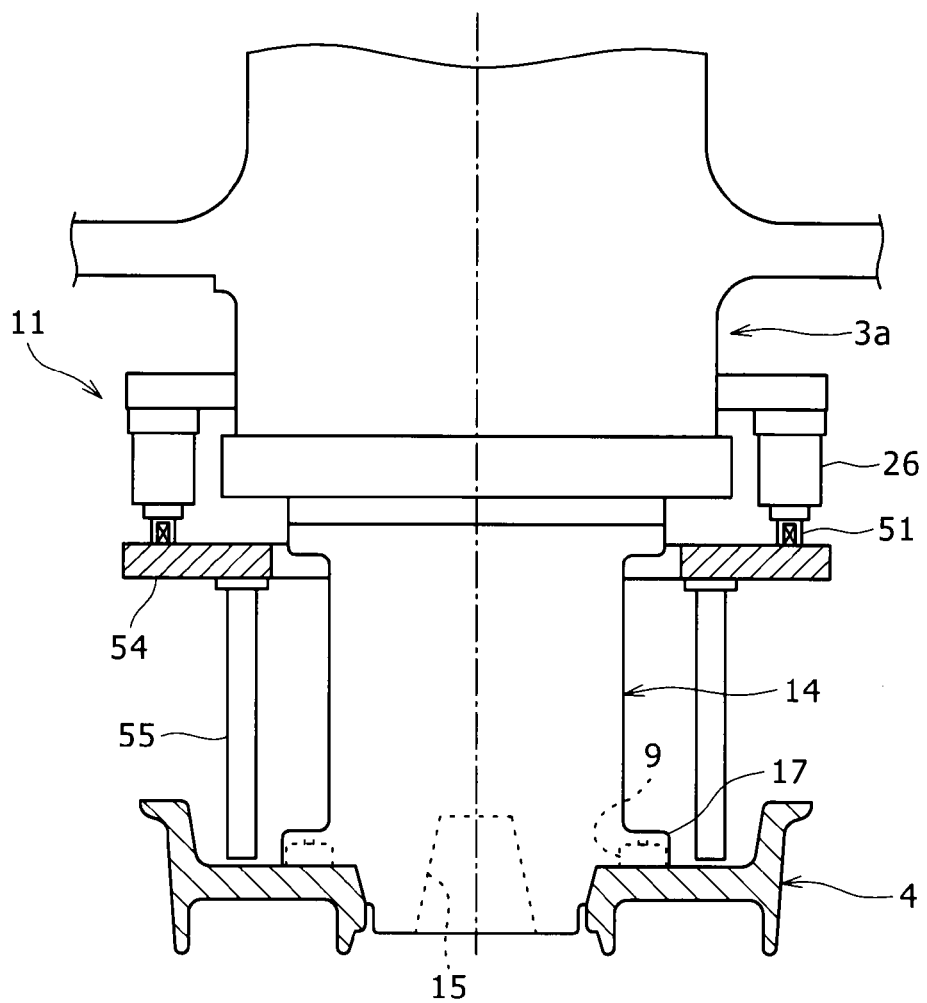
FIG. 16 is a partially sectioned front view showing an upper rim replacing device according to a fifteenth embodiment of the present invention.

Next, a fifteenth embodiment according to the present invention will be described while referring to FIG. 16.

The difference between the upper rim replacing device 11 according to the present embodiment and the one in the twelfth embodiment lies in the fact that the pressing member which is included in the upper rim replacing device 11 includes a lifting ring 54 and a plurality of pressure rods 55, in addition to a plurality of pressing rods 51 which are respectively coupled with the plurality of actuators as described above.

The lifting ring 54 has a circular shape, which surrounds the upper spindle 14, is arranged at a position radially outward remote from the outer circumferential surface of the upper spindle 14, and is coupled to lower ends of the pressing rods 51 which are mounted in the respective actuators 26 with screws, for instance, so as to couple the actuators 26 in a circumferential direction. Accordingly, this lifting ring 54 is lifted by the actuators 26 which operate in synchronicity with each other.

The respective pressure rods 55 are shaped as a round bar or multiangular bar in a vertical direction (rectangular bar-shaped or hexagonal bar-shaped) and are arranged at a plurality of positions at predetermined intervals along the lifting ring 54 (specifically in a circumferential direction), with an upper end of the respective pressure rods 55 being secured to a lower surface of the lifting ring 54. Specifically, the respective pressure rods 55 move in a vertical direction integrally with this lifting ring 54, with the pressure rods 55 extending downward from a lower surface of the lifting ring 54. The lower ends of the respective pressure rods 55 then come in contact with an upper surface of the upper rim 4, depressing the upper rim 4.

In this detaching device 50, as the lifting ring 54 and a plurality of pressure rods 55 are lowered together due to the operation of a plurality of actuators 26, a lowering operation of parts which come in direct contact with the upper rim 4, more specifically, the lower end of a plurality of pressure rods 55, is more reliably ensured.

The number of pressure rods 55 may be different from the number of actuators 26. For instance, if a sufficient pressing power is obtained to cause the upper rim 4 to detach with a small number of actuators 26, but the diameter of the upper rim 4 is large and a stable pressing cannot be ensured with a small number of pressure rods 55, a larger number of pressure rods 55 than the number of actuators 26 may be used. Alternatively, instead of a plurality of pressure rods 55, a single cylindrical shaped member (for instance, plate formed in a cylindrical shape so as to surround the upper spindle 14) may be coupled with the lifting ring 54 as a contact member which comes in direct contact with the upper rim 4.

The tapered shape of the pressing rods 51 according to the thirteenth embodiment can also be applied to a contact member as represented by the pressure rod 55. Similarly, the upper rim 4 which has a depressed surface 53 according to a fourteenth embodiment can also be applied to a device according to a fifteenth embodiment which includes the pressure rods 55.

The rest of the construction and advantages thereof are substantially similar with those of the twelfth embodiment.

The rim replacing device according to the present invention is not limited to the above-described embodiments, and the shape, construction, material, combination of the respective members can be appropriately modified without changing the nature of the invention.

For instance, in the tire testing device 1 shown in FIG. 1, the lower spindle 16 is lifted for coupling with the upper spindle 14, and testing of the tire T is carried out at this coupling position, however, the upper spindle 14 may be lowered and testing of the tire T may be carried out at its coupling position with the lower spindle 16.

As described hereinbefore, the present invention provides a technology which can solve inconveniences attributed to a permanent magnet used for rim mounting in a tire testing device.

More specifically, a first aspect of the present invention provides a rim mounting device which is easily handled after breakage of a permanent magnet due to an impact produced at the time of magnetically mounting the permanent magnet. This rim mounting device that is installed in a tire testing device having a spindle for rotating a tire, and is adapted to mount a rim to a tip of the spindle, the rim mounting device, includes: a rim mounting section provided at the tip of the spindle, the rim mounting section having a rim mounting surface capable of being contacted with the rim, and a plurality of mounting recesses formed on the rim mounting surface so as to be arranged side by side; a plurality of permanent magnets mounted in the rim mounting section so as to be inserted in the mounting recesses, respectively, and adapted to generate a magnetic force for attracting the rim to the rim mounting surface; and a scatter suppression member provided inside each of the mounting recesses, and being adapted to suppress scatter of fragments generated when each permanent magnet inserted in each mounting recess breaks. This scatter suppression member prevents scatter of fragments at the time the permanent magnets break due to an impact at the time of magnetically mounting the permanent magnets, making handling thereof after such breakage easier.

Preferably, the scatter suppression members are lid bodies adapted to cover the permanent magnets from outside, each lid body having an opposite surface facing the rim, and being provided so that the opposite surface is arranged on the same plane as the rim mounting surface, or alternatively, further inside the mounting recesses than the rim mounting surface. The lid bodies mounted in this way are less likely to receive an impact at the time of mounting the rim, which makes it possible to efficiently suppress breakage of the permanent magnets provided at a back side of the lid bodies.

The lid bodies may be made of a non-magnetic material, or of a magnetic material. However, in case the lid bodies are made of a magnetic material, it is preferable that the rim mounting device further includes case bodies each made of a non-magnetic material, opening in the same direction as an opening direction of the mounting recesses, adapted to enclose each permanent magnet from a direction orthogonal to the opening direction, and inserted together with each permanent magnet inside each of said mounting recesses; each lid body being adapted to cover each permanent magnet while an outer circumferential surface of the lid body is contacted with an inner circumferential surface of each case body.

In this construction, it is possible to prevent the magnetic force towards the spindle from weakening the force for attracting a rim. Also, even in the event the spindle is made of a magnetic material, as the case bodies, which is made of a non-magnetic material and adapted to enclose the permanent magnets, weaken the magnetic force from the permanent magnets towards the spindle made of a magnetic material, making mounting/removal of the permanent magnets with respect to the mounting recesses easier.

If the lid bodies made of a magnetic material cover the entire openings of the mounting recesses, in other words, if the permanent magnets and the spindle are connected via the lid bodes made of a magnetic material, the magnetic force towards the rim may be weakened. However, as the lid bodies are provided so as to cover the permanent magnets, with an outer circumferential surface of each lid body coming in contact with an inner circumferential surface of each case body, weakening of the magnetic force is prevented.

To obtain such a state, for instance, an opening side end section of each case body may have a smaller inner diameter than that of a main body section thereof located at the back of the opening side end section and enclosing each permanent magnet; and each lid body may include a small diameter section having an outer diameter capable of being fitted in the inside of the opening side end section of each case body, and a large diameter section having an outer diameter larger than the outer diameter of the small diameter section and capable of being fitted in the inside of the main body section of each case body.

Preferably, the rim mounting section has through holes each extending from the outside of the spindle to a bottom surface of each mounting recess to communicate with the inside of each mounting recess, and a bottom plate is provided on the bottom surface of each mounting recess to entirely cover the bottom surface and be contacted with each permanent magnet, or the case bodies are bottomed. In this construction, even if a permanent magnet breaks in a mounting recess and fragments are produced, a bar body, for instance, is inserted from the through hole inside the mounting recess to depress the bottom plate or a bottom section of the case body from the bottom surface of the mounting recess, whereby the bottom plate or the bottom section of the case body can push all the fragments to the outside of the mounting recesses at one time. Thus, the cleaning operation of the fragments of the permanent magnet becomes easy, and a permanent magnet replacement operation will be carried out efficiently.

Alternatively, each scatter suppression member may be a covering member adapted to cover an entire surface of each permanent magnet, the covering member may have an opposite surface facing the rim and be provided so that the opposite surface is arranged on the same plane as the rim mounting surface or further inside the mounting recesses than the rim mounting surface. The covering member suppresses scatter of fragments by keeping the fragments of the broken permanent magnet at an inner side of the covering member. Furthermore, as the opposite surface of this scatter suppression member is positioned on the same plane as the rim mounting surface or lies at a back side thereof, it is possible to suppress breakage of the permanent magnets by preventing an impact between the rim and the permanent magnets at the time of contact between the rim and the mounting surface of the rim.

A second aspect of the present invention has as object to provide a magnet mounting method which can prevent breakage of a permanent magnet caused when the permanent magnet is magnetically strongly attracted to a predetermined mounting location, enabling the permanent magnet mounting operation to be carried out more easily and efficiently. To achieve this object, the magnet mounting method according to this invention is a method for mounting a permanent magnet in a spindle of a tire testing device, including the spindle for rotating a tire, a rim fixed to this spindle for holding the tire at the spindle side, and a permanent magnet generating a magnetic force to fix the rim to the spindle, wherein at least a portion of the spindle to which the permanent magnet is mounted is made of a magnetic material, the method includes: forming, in the spindle, a bottomed mounting recess, in which the permanent magnet is inserted, and a through hole extending from a bottom surface of this mounting recess towards a side of the mounting recess opposite to an opening thereof; inserting a guide member in the through hole, so that an end section thereof penetrates from the bottom surface of the mounting recess towards the opening side thereof; and inserting the permanent magnet inside the mounting recess while the bottom section side of the permanent magnet is supported by the end section of the guide member against a force of the bottom surface that attracts the permanent magnet due to a magnetic force of the permanent magnet.

With this method, the permanent magnet is supported by a guide member from a bottom surface side of the mounting recess, which inhibits an impact between the permanent magnet and a bottom surface of the mounting recess or another portion of the spindle, which impact is caused by the magnetic force of the permanent magnet, efficiently suppressing breakage of this permanent magnet due to such impact. More specifically, even if a force (magnetic attraction force) acts on between the permanent magnet and the upper spindle, in which the mounting recess is formed, so that they attract to each other, it is possible to prevent the permanent magnet from strongly hitting the bottom surface of the mounting recess, or the like, and breaking, since the guide member supports the permanent magnet from a bottom surface of the mounting recess.

More preferably, the mounting recess opens toward the side facing the rim and the permanent magnet is inserted inside the mounting recess from the rim side. This construction reduces the distance between the permanent magnet and the rim, which can help to intensify the attraction force produced by the magnetic force of the permanent magnet.

In the present invention, the guide member can be made of a magnetic material and inserted in the through hold until the end section thereof penetrates the opening in the mounting recess, so that the permanent magnet is inserted inside the mounting recess while being attracted towards the end section of the guide member due to its own magnetic force The attraction between the permanent magnet and the end section of the guide member can suppress a horizontal shift of the guide member from the end section of the guide member, and can prevent the permanent magnet from approaching the mounting recess or the like even in the event an attraction force accidentally acts on the permanent magnet from the inside of the mounting recess or the surface of the spindle. Thus, the permanent magnet can be inserted inside the mounting recess while being stably supported by the guide member, and this prevents insertion thereof from being inhibited by the attraction force.

In the present invention, a variety of elements can be provided with respect to the permanent magnet.

For instance, a lid body adapted to cover a surface of the permanent magnet on the side facing the rim and prevent direct contact between the surface and the rim may be inserted in the mounting recess integrally with or independently from the permanent magnet. This lid body can suppress scatter of magnet fragments produced when the permanent magnet breaks due to an impact applied to the permanent magnet from the outside, to the outside of the mounting recess, which makes it possible to prevent a decrease in productivity.

Alternatively, a case body made of a non-magnetic material and adapted to enclose the permanent magnet from a direction orthogonal to an opening direction of the mounting recess and prevent direct contact between an outer circumferential surface of the permanent magnet and an inner circumferential surface of the mounting recess may be inserted inside the mounting recess integrally with or independently from the permanent magnet. This case body prevents the permanent magnet from being directly attracted to the inner circumferential surface of the mounting recess, weakening the force with which the permanent magnet is attracted towards the inner circumferential surface of the mounting recess, which makes insertion of the permanent magnet inside the mounting recess easier.

Alternatively, a bottom body adapted to prevent direct contact between the permanent magnet and a bottom surface of the mounting recess may be inserted in the mounting recess integrally with the permanent magnet. This bottom body prevents the permanent magnet from strongly directly hitting the bottom surface of the mounting recess, to protect the permanent magnet, reducing the risk of breakage. Furthermore, if this bottom body is made of a magnetic material, it will attract the broken permanent magnet fragments, making it easier to remove the fragments from the mounting recess.

More preferably, an outer circumferential surface of the case body and an inner circumferential surface of the mounting recess have shapes that allow their thread engagement, and the case body integrally with the permanent magnet is inserted in the mounting recess while being screwed thereinto. Such the thread engagement enables insertion to be carried out easily against the magnetic force acting on the permanent magnet by rotating the case body with respect to the mounting recess. Furthermore, as the case body is screwed in the mounting recess, the case body will not fall out of the mounting recess.

Preferably, an outer circumferential surface of the guide member and an inner circumferential surface of the through hole have shapes that allow their thread engagement, the guide member is inserted up to the mounting recess while being in the thread engagement and rotated with respect to the through hole, and the permanent magnet is inserted inside the mounting recess while the end section of the guide member supports a bottom section side of the permanent magnet, and a position of the end section of the guide member is adjusted by rotation of the guide member. This thread engagement prevents any sudden movements of the guide member inside the mounting recess, thereby ensuring a more reliable support for the permanent magnet by the end section of the guide member.

Also, with respect to a magnet mounting method of this invention, a permanent magnet can be mounted/removed with respect to a mounting recess even if the permanent magnet is not guided by a guide member. More specifically, the following steps may be carried out: forming, in a spindle, a bottomed mounting recess, in which a permanent magnet is inserted; preparing a case body adapted to prevent direct contact between the permanent magnet and an inner circumferential surface and bottom surface of the mounting recess, and shaping an outer circumferential surface of this case body and the inner circumferential surface of the mounting recess so as to allow their thread engagement; and screwing the case body into the mounting recess to insert the case body together with the permanent magnet in the mounting recess while a bottom section side of the permanent magnet is supported by the case body against a force of the bottom surface of the mounting recess attracting the permanent magnet due to a magnetic force of the permanent magnet.

With this method, a permanent magnet which is mounted in a case body can be removed together with the case body from the mounting recess by rotating the case body, which prevents the permanent magnet from tilting in the mounting recess at the time of removal thereof, making such removal operation easier. Also, insertion/removal of a guide member as described above becomes unnecessary.

A third aspect of the present invention has as objective to provide a rim replacing device in a tire testing device which can reliably fix even a heavyweight upper rim to the upper spindle and easily remove it therefrom, and does not cause a decrease in the uniformity measuring accuracy. To achieve this objective, the rim replacing device according to this invention is a rim replacing device provided in a tire testing device, the tire testing device including an upper rim and a lower rim capable of clamping a tire, an upper spindle for holding the upper rim, a lower spindle for holding the lower rim so that an axial center thereof becomes coaxial with an axial center of the upper rim, an upper spindle housing for rotatably supporting the upper spindle around the axial center, and an upper frame for supporting the upper spindle housing, the rim replacing device being adapted to replace the upper rim held by the upper spindle and including: a plurality of permanent magnets respectively provided in the upper spindle at a plurality of locations around an axial center thereof and generating a magnetic force for attracting the upper rim to the upper spindle; and a detaching device for detaching the upper rim, which is attracted to the upper spindle by the magnetic force of these permanent magnets, from the upper spindle. The detaching device is fixed to the upper frame and presses the upper rim at a position radially outward remote from an outer circumferential surface of the upper spindle, in a direction to detach this upper rim from the upper spindle.

Since a detaching device in this device is provided at a position radially outward remote from an outer circumferential surface of an upper spindle where a permanent magnet is provided, the position of the detaching device does not interfere with the permanent magnet irrespective of the number and size of the permanent magnet. Accordingly, the number and size of permanent magnets at the upper spindle can be increased, without taking into consideration of the location of this detaching device. This can help to intensify the magnetic force for attracting an upper rim to the upper spindle, making it possible to reliably secure a heavy rim to the upper spindle.

In addition, the detaching device is fixed to an upper frame which supports an upper spindle housing for rotatably holding the upper spindle, which, it does not rotate integrally with the upper spindle unlike the background art. Thus, an error component which is attributed to the rotation of this detaching device will not be applied to a uniformity measuring system, which enables high accuracy measuring of uniformity.

In the present invention, the detaching device may have an actuator hanging down from the upper frame and is adapted to output a downward pressing force, and a pressing member coupled to the actuator; and the pressing member may have a lower end section which is contacted with the upper rim and transmit the pressing force outputted by the actuator to the upper rim. In this case, the detaching device may further comprise a bracket hanging down from the upper frame at a position radially outward remote from an outer circumferential surface of the upper spindle; and the actuator may be provided at a lower section of the bracket. Furthermore, the pressing member may be provided at a position radially outward remote from an outer circumferential surface of the upper spindle, and include a lifting ring which is driven to be lifted or lowered by the actuator, and a plurality of pressure rods which are respectively provided at a plurality of locations in this lifting ring at predetermined intervals in a circumferential direction thereof and extend downward from the lifting ring, with lower end sections thereof being contact with the upper rim.

Preferably, the lower end section of the pressing member is shaped so that a cross sectional area thereof becomes gradually smaller in a downward direction. This shape makes it possible to reliably depress an upper rim using a lower end section of a pressing member which has a small cross section, even in the event an outer diameter of the upper rim is small and it is hard to secure a depressing position, for instance.

Among tire testing devices, including: an upper rim and a lower rim capable of clamping a tire; an upper spindle for holding the upper rim; a lower spindle for holding the lower rim so that an axial center thereof becomes coaxial with an axial center of the upper rim; an upper spindle housing for rotatably supporting the upper spindle around the axial center; an upper frame for supporting the upper spindle housing; and the above rim replacing device adapted to replace the upper rim held by the upper spindle, it is preferable that the upper rim has a to-be-attracted section which is attracted to the upper spindle shaft, a rim outer circumferential surface adapted to support a bead section of the tire at a position radially outside remote from the to-be-attracted section, and a pressed surface arranged at a position between the to-be-attracted section and the rim outer circumferential section and adapted to receive a pressing force from the actuator at this position. The upper rim which has such a pressed surface can receive a depressing force from the pressing member, even if an outer diameter thereof is small.

The invention claimed is:

1. A rim mounting device installed in a tire testing device having a spindle for rotating a tire, and configured to mount a rim to a tip of the spindle, the rim mounting device comprising:
a rim mounting section provided at the tip of the spindle, said rim mounting section having a rim mounting surface configured to be capable of being contacted with the rim, and a plurality of mounting recesses formed on said rim mounting surface so as to be arranged side by side;
a plurality of permanent magnets mounted in said rim mounting section so as to be inserted in said mounting recesses, respectively, to generate a magnetic force for attracting the rim to said rim mounting surface; and
a scatter suppression member provided inside each of said mounting recesses, to suppress scatter of fragments generated when each permanent magnet inserted in each mounting recess breaks.

2. The rim mounting device according to claim 1, wherein said scatter suppression members are lid bodies configured to cover said permanent magnets from outside, each lid body having an opposite surface facing the rim, and being provided so that said opposite surface is arranged on the same plane as said rim mounting surface, or alternatively, further inside said mounting recesses than said rim mounting surface.

3. The rim mounting device according to claim 2, wherein said lid bodies are made of a non-magnetic material.

4. The rim mounting device according to claim 2, wherein said lid bodies are made of a magnetic material; and
the rim mounting device further comprises case bodies each made of a non-magnetic material, opening in the same direction as an opening direction of said mounting recesses, configured to enclose each permanent magnet from a direction orthogonal to the opening direction, and inserted together with each permanent magnet inside each of said mounting recesses;
each lid body being configured to cover each permanent magnet while an outer circumferential surface of each lid body is contacted with an inner circumferential surface of each case body.

5. The rim mounting device according to claim 4, wherein an opening side end section of each case body has a smaller inner diameter than that of a main body section thereof located at the back of said opening side end section and enclosing each permanent magnet; and
each lid body includes a small diameter section having an outer diameter capable of being fitted in the inside of said opening side end section of each case body, and a large diameter section having an outer diameter larger than the outer diameter of said small diameter section and capable of being fitted in the inside of said main body section of each case body.

6. The rim mounting device according to claim 3, wherein said rim mounting section has through holes each extending from the outside of the spindle to a bottom surface of each mounting recess to communicate with the inside of each mounting recess, and a bottom plate is provided on said bottom surface of each mounting recess to entirely cover said bottom surface and be contacted with each permanent magnet.

7. The rim mounting device according to claim 4, wherein a through hole is provided in a bottom surface of each mounting recess to extend from the outside of the spindle to said bottom surface of each mounting recess, and said case bodies are bottomed.

8. The rim mounting device according to claim 1, wherein each scatter suppression member is a covering member configured to cover an entire surface of each permanent magnet, said covering member has an opposite surface facing the rim and is provided so that said opposite surface is arranged on the same plane as said rim mounting surface or further inside said mounting recesses than said rim mounting surface.

9. A method for mounting a permanent magnet in a spindle of a tire testing device, including the spindle for rotating a tire, a rim fixed to this spindle for holding the tire at the spindle side, and a permanent magnet generating a magnetic force to fix the rim to the spindle,
the method, comprising:
forming, in the spindle, a bottomed mounting recess, in which the permanent magnet is inserted, and a through hole extending from a bottom surface of this mounting recess towards a side of the mounting recess opposite to an opening thereof;
inserting a guide member in the through hole, so that an end section thereof penetrates from the bottom surface of the mounting recess towards the opening side thereof; and
inserting the permanent magnet inside the mounting recess while the bottom section side of the permanent magnet is supported by the end section of the guide member against a force of the bottom surface that attracts the permanent magnet due to a magnetic force of the permanent magnet.

10. The method for mounting a permanent magnet in a tire testing device according to claim 9, wherein
the mounting recess opens toward the side facing the rim and the permanent magnet is inserted inside the mounting recess from the rim side.

11. The method for mounting a permanent magnet in a tire testing device according to claim 9, wherein
the guide member is made of a magnetic material and is inserted in the through hole until the end section thereof penetrates the opening in the mounting recess, so that the permanent magnet is inserted inside the mounting recess while being attracted towards the end section of the guide member due to its own magnetic force.

12. The method for mounting a permanent magnet in a tire testing device according to claim 9, wherein
a lid body configured to cover a surface of the permanent magnet on the side facing the rim and prevent direct contact between the surface and the rim is inserted in the mounting recess integrally with or independently from the permanent magnet.

13. The method for mounting a permanent magnet in a tire testing device according to claim 9, wherein
a case body made of a non-magnetic material and configured to enclose the permanent magnet from a direction orthogonal to an opening direction of the mounting recess and prevent direct contact between an outer circumferential surface of the permanent magnet and an inner circumferential surface of the mounting recess is inserted inside the mounting recess integrally with or independently from the permanent magnet.

14. The method for mounting a permanent magnet in a tire testing device according to claim 9, wherein
a bottom body configured to prevent direct contact between the permanent magnet and a bottom surface of the mounting recess is inserted in the mounting recess integrally with the permanent magnet.

15. The method for mounting a permanent magnet in a tire testing device according to claim 14, wherein
the bottom body is made of a magnetic material.

16. The method for mounting a permanent magnet in a tire testing device according to claim 13, wherein
an outer circumferential surface of the case body and an inner circumferential surface of the mounting recess have shapes that allow their thread engagement, and the case body integrally with the permanent magnet is inserted in the mounting recess while being screwed thereinto.

17. The method for mounting a permanent magnet in a tire testing device according to claim 9, wherein
an outer circumferential surface of the guide member and an inner circumferential surface of the through hole have shapes that allow their thread engagement, the guide member is inserted up to the mounting recess while in the thread engagement and rotated with respect to the through hole, and the permanent magnet is inserted inside the mounting recess while the end section of the guide member supports a bottom section side of the permanent magnet, and a position of the end section of the guide member is adjusted by rotation of the guide member.

18. A method for mounting a permanent magnet in a spindle of a tire testing device, including the spindle for rotating a tire, a rim fixed to this spindle for holding the tire at the spindle side, and a permanent magnet generating a magnetic force to fix the rim to the spindle,
the method comprising:
forming, in the spindle, a bottomed mounting recess, in which the permanent magnet is inserted;
preparing a case body configured to prevent direct contact between the permanent magnet and an inner circumferential surface and bottom surface of the mounting recess, and shaping an outer circumferential surface of this case body and the inner circumferential surface of the mounting recess so as to allow their thread engagement; and
screwing the case body into the mounting recess to insert the case body together with the permanent magnet in the mounting recess while a bottom section side of the permanent magnet is supported by the case body against a force of the bottom surface of the mounting recess attracting the permanent magnet due to a magnetic force of the permanent magnet.

19. A rim replacing device provided in a tire testing device, the tire testing device including an upper rim and a lower rim configured to be capable of clamping a tire, an upper spindle for holding the upper rim, a lower spindle for holding the lower rim so that an axial center thereof becomes coaxial with an axial center of the upper rim, an upper spindle housing for rotatably supporting the upper spindle around the axial center, and an upper frame for supporting the upper spindle housing, the rim replacing device being configured to replace the upper rim held by the upper spindle and comprising:
a plurality of permanent magnets respectively provided in the upper spindle at a plurality of locations around an axial center thereof and generating a magnetic force for attracting the upper rim to the upper spindle; and
a detaching device for detaching the upper rim, which is attracted to the upper spindle by the magnetic force of said permanent magnets, from the upper spindle;
wherein said detaching device is fixed to the upper frame and presses the upper rim at a position radially outward remote from an outer circumferential surface of the upper spindle, in a direction to detach this upper rim from the upper spindle.

20. The rim replacing device provided in a tire testing device according to claim 19, wherein
said detaching device has an actuator hanging down from the upper frame and configured to output a downward pressing force, and a pressing member coupled to said actuator; and
said pressing member has a lower end section which is contacted with the upper rim and transmits the pressing force outputted by said actuator to the upper rim.

21. The rim replacing device provided in a tire testing device according to claim 20, wherein
said detaching device further comprises a bracket hanging down from the upper frame at a position radially outward remote from an outer circumferential surface of the upper spindle; and
said actuator is provided at a lower section of said bracket.

22. The rim replacing device provided in a tire testing device according to claim 20, wherein
said pressing member is provided at a position radially outward remote from an outer circumferential surface of the upper spindle, and comprises a lifting ring which is driven to be lifted or lowered by said actuator, and a plurality of pressure rods which are respectively provided at a plurality of locations in said lifting ring at predetermined intervals in a circumferential direction thereof and extend downward from said lifting ring, with lower end sections thereof being contact with the upper rim.

23. The rim replacing device provided in a tire testing device according to claim 20, wherein
said lower end section of said pressing member is shaped so that a cross sectional area thereof becomes gradually smaller in a downward direction.

24. A tire testing device comprising:
an upper rim and a lower rim configured to be capable of clamping a tire;
an upper spindle for holding said upper rim;
a lower spindle for holding said lower rim so that an axial center thereof becomes coaxial with an axial center of said upper rim;
an upper spindle housing for rotatably supporting said upper spindle around the axial center;
an upper frame for supporting said upper spindle housing; and
the rim replacing device according to claim 20 configured to replace said upper rim held by said upper spindle;
wherein said upper rim has a to-be-attracted section which is attracted to said upper spindle shaft, a rim outer circumferential surface configured to support a bead section of the tire at a position radially outside remote from said to-be-attracted section, and a pressed surface arranged at a position between said to-be-attracted section and said rim outer circumferential section and configured to receive a pressing force from said actuator at this position.

* * * * *